(12) United States Patent
Cheng

(10) Patent No.: US 11,266,208 B2
(45) Date of Patent: Mar. 8, 2022

(54) MALE BUCKLING COMPONENT FOR MAGNETIC BUCKLING ASSEMBLY

(71) Applicant: Wonderland Switzerland AG, Steinhausen (CH)

(72) Inventor: Manqun Cheng, Guangdong (CN)

(73) Assignee: WONDERLAND SWITZERLAND AG, Steinhausen (CH)

(*) Notice: Subject to any disclaimer, the term of this patent is extended or adjusted under 35 U.S.C. 154(b) by 0 days.

(21) Appl. No.: 17/080,281

(22) Filed: Oct. 26, 2020

(65) Prior Publication Data
US 2021/0076784 A1    Mar. 18, 2021

Related U.S. Application Data

(63) Continuation of application No. 16/211,248, filed on Dec. 6, 2018, now Pat. No. 10,874,178.

(30) Foreign Application Priority Data

| Dec. 7, 2017 | (CN) | 201711284857.0 |
| May 3, 2018 | (CN) | 201820665048.8 |
| Sep. 20, 2018 | (CN) | 201821544286.X |

(51) Int. Cl.
| A44B 11/25 | (2006.01) |
| B62B 9/24 | (2006.01) |
| A44B 11/26 | (2006.01) |
| A47D 13/02 | (2006.01) |
| B62B 3/14 | (2006.01) |

(52) U.S. Cl.
CPC ........ *A44B 11/2546* (2013.01); *A44B 11/258* (2013.01); *A44B 11/2511* (2013.01); *A44B 11/2584* (2013.01); *A44B 11/263* (2013.01); *B62B 9/24* (2013.01); *A44D 2203/00* (2013.01); *A47D 13/02* (2013.01); *B62B 3/1452* (2013.01); *Y10T 24/32* (2015.01)

(58) Field of Classification Search
CPC ........ A41F 1/002; Y10T 24/32; Y10T 292/11; A45C 13/1069; H01F 7/0263; A43B 1/0054; A44D 2203/00
See application file for complete search history.

(56) References Cited

U.S. PATENT DOCUMENTS

| 3,041,697 A | 7/1962 | Frances |
| D273,840 S | 5/1984 | Morita |
| (Continued) | | |

FOREIGN PATENT DOCUMENTS

| CN | 104856373 A | 8/2015 |
| EP | 3165117 B1 | 4/2018 |
| (Continued) | | |

*Primary Examiner* — Robert Sandy
*Assistant Examiner* — Michael S Lee
(74) *Attorney, Agent, or Firm* — Pilloff Passino & Cosenza LLP; Sean A. Passino; Rachel K. Pilloff

(57) ABSTRACT

A male buckling component for a magnetic buckling assembly. The male buckling component comprises a male locking portion having a column structure. The male locking portion comprises an abutting structure at an end of the column structure, and a male engaging structure adjacent to the abutting structure and formed around a circumference of the column structure. An installation chamber is formed inside the male locking portion, and a male magnetic component is installed into the installation chamber so that the male magnetic component is inside the male locking portion of the male buckling component.

30 Claims, 32 Drawing Sheets

(56) References Cited

U.S. PATENT DOCUMENTS

| | | |
|---|---|---|
| D294,810 S | 3/1988 | Morita |
| D301,566 S | 6/1989 | Heiberger |
| D319,201 S | 8/1991 | Aoki |
| D330,509 S | 10/1992 | Belknap |
| D335,266 S | 5/1993 | Morita |
| D360,391 S | 7/1995 | Aoki |
| D375,061 S | 10/1996 | Morita |
| 5,630,258 A | 5/1997 | Schneider |
| D386,669 S | 11/1997 | Aoki |
| D400,429 S | 11/1998 | Morita |
| D401,889 S | 12/1998 | Wong |
| D411,478 S | 6/1999 | Kenagy |
| D412,865 S | 8/1999 | Aoki |
| D413,282 S | 8/1999 | Aoki |
| D425,780 S | 5/2000 | Aoki |
| D426,491 S | 6/2000 | Chan |
| D426,765 S | 6/2000 | Aoki |
| D430,483 S | 9/2000 | Wah et al. |
| D431,453 S | 10/2000 | Chan |
| D432,400 S | 10/2000 | Chan |
| D434,644 S | 12/2000 | Aoki |
| D438,451 S | 3/2001 | Reiter |
| D439,147 S | 3/2001 | Kenagy |
| D441,317 S | 5/2001 | Nire |
| D441,639 S | 5/2001 | Reiter |
| D450,625 S | 11/2001 | Khromachou |
| D452,137 S | 12/2001 | Aoki |
| D452,643 S | 1/2002 | Morita |
| D452,644 S | 1/2002 | Morita |
| D452,813 S | 1/2002 | Morita |
| D453,105 S | 1/2002 | Morita |
| D454,482 S | 3/2002 | Morita |
| D456,130 S | 4/2002 | Towns |
| D457,834 S | 5/2002 | Morita |
| D461,116 S | 8/2002 | Aoki |
| D461,400 S | 8/2002 | Aoki |
| D462,255 S | 9/2002 | Aoki |
| D464,562 S | 10/2002 | Reiter |
| D481,298 S | 10/2003 | Aoki |
| D482,266 S | 11/2003 | Aoki |
| D504,311 S | 4/2005 | Aoki |
| D506,921 S | 7/2005 | Aoki |
| D511,449 S | 11/2005 | Aoki |
| D518,707 S | 4/2006 | Aoki |
| D527,618 S | 9/2006 | Aoki |
| D527,620 S | 9/2006 | Aoki |
| D539,132 S | 3/2007 | Aoki |
| D555,470 S | 11/2007 | Aoki |
| D556,032 S | 11/2007 | Aoki |
| D558,038 S | 12/2007 | Aoki |
| D569,717 S | 5/2008 | Aoki |
| D570,672 S | 6/2008 | Aoki |
| D572,579 S | 7/2008 | Aoki |
| D581,774 S | 12/2008 | Aoki |
| D584,601 S | 1/2009 | Aoki |
| D584,602 S | 1/2009 | Aoki |
| D595,123 S | 6/2009 | Aoki |
| D618,590 S | 6/2010 | Paik |
| D671,443 S | 11/2012 | Paik et al. |
| D671,862 S | 12/2012 | Metsker |
| 8,353,544 B2 | 1/2013 | Fiedler |
| 8,359,716 B2 | 1/2013 | Fiedler |
| 8,368,494 B2 | 2/2013 | Fiedler |
| 8,430,434 B2 | 4/2013 | Fiedler |
| 8,464,403 B2 | 6/2013 | Fiedler |
| 8,484,809 B2 | 7/2013 | Fiedler |
| 8,495,803 B2 | 7/2013 | Fiedler |
| D691,879 S | 10/2013 | Bernard |
| 8,739,371 B2 | 6/2014 | Fiedler |
| 8,794,682 B2 | 8/2014 | Fiedler |
| 8,800,117 B2 | 8/2014 | Fiedler |
| 8,850,670 B2 | 10/2014 | Fiedler |
| 8,851,534 B2 | 10/2014 | Fiedler |
| 9,044,071 B2 | 6/2015 | Fiedler |
| 9,096,148 B2 | 8/2015 | Fiedler |
| 9,101,185 B1 | 8/2015 | Greenberg |
| 9,245,678 B2 | 1/2016 | Fiedler |
| D749,983 S | 2/2016 | Paik et al. |
| 9,249,814 B2 | 2/2016 | Tsai |
| D774,413 S | 12/2016 | Paik et al. |
| 9,555,935 B2 | 1/2017 | Fiedler |
| D778,207 S | 2/2017 | Paik et al. |
| D778,777 S | 2/2017 | Paik et al. |
| 9,572,410 B2 | 2/2017 | Fiedler |
| D782,152 S | 3/2017 | Woodward |
| 9,635,919 B2 | 5/2017 | Fiedler |
| 9,677,581 B2 | 6/2017 | Tucholke et al. |
| 9,717,323 B2 | 8/2017 | Tsai |
| 9,907,367 B2 | 3/2018 | Paik et al. |
| 9,936,772 B2 | 4/2018 | Paik |
| D817,830 S | 5/2018 | Archambault |
| 9,986,791 B2 | 6/2018 | Botkus et al. |
| D822,536 S | 7/2018 | Wu |
| 10,098,422 B2 | 10/2018 | Fiedler et al. |
| 10,111,499 B2 | 10/2018 | Fiedler et al. |
| 10,143,270 B2 | 12/2018 | Fiedler et al. |
| 10,179,548 B2 | 1/2019 | Fiedler et al. |
| 10,202,790 B2 | 2/2019 | Fiedler |
| 10,212,993 B2 | 2/2019 | Fiedler et al. |
| D845,168 S | 4/2019 | Paik et al. |
| 10,315,549 B2 | 6/2019 | Fiedler |
| 10,328,983 B2 | 6/2019 | Fiedler et al. |
| 10,383,409 B2 | 8/2019 | Fiedler |
| 10,385,895 B2 | 8/2019 | Fiedler et al. |
| 10,578,241 B2 | 3/2020 | Fiedler |
| 10,617,179 B2 | 4/2020 | Fiedler et al. |
| 10,626,636 B2 | 4/2020 | Fiedler |
| 10,703,429 B2 | 7/2020 | Fiedler et al. |
| 10,758,019 B2 | 9/2020 | Paik et al. |
| 10,791,804 B2 | 10/2020 | Chu et al. |
| 2010/0283269 A1 | 11/2010 | Fiedler |
| 2010/0308605 A1 | 12/2010 | Fiedler |
| 2010/0325844 A1 | 12/2010 | Fiedler |
| 2011/0001025 A1 | 1/2011 | Fiedler |
| 2011/0030174 A1 | 2/2011 | Fiedler |
| 2011/0131770 A1 | 6/2011 | Fiedler |
| 2011/0167595 A1 | 7/2011 | Fiedler |
| 2011/0296653 A1 | 12/2011 | Fiedler |
| 2011/0298227 A1 | 12/2011 | Fiedler |
| 2012/0124786 A1 | 5/2012 | Fiedler |
| 2012/0216373 A1 | 8/2012 | Fiedler |
| 2012/0227220 A1 | 9/2012 | Fiedler |
| 2012/0248793 A1 | 10/2012 | Fiedler |
| 2012/0291227 A1 | 11/2012 | Fiedler |
| 2013/0011179 A1 | 1/2013 | Fiedler |
| 2014/0317890 A1 | 10/2014 | Koons et al. |
| 2014/0339232 A1 | 11/2014 | Fiedler |
| 2016/0198813 A1 | 7/2016 | Fiedler et al. |
| 2017/0015229 A1 | 1/2017 | Fiedler |
| 2018/0132670 A1 | 5/2018 | Beckerman et al. |
| 2019/0174875 A1 | 6/2019 | Cheng |

FOREIGN PATENT DOCUMENTS

| | | |
|---|---|---|
| EP | 3165118 B1 | 6/2018 |
| EP | 3183986 B1 | 7/2018 |
| EP | 3616552 A1 | 3/2020 |
| WO | 2020173410 A1 | 9/2020 |

MALE BUCKLING COMPONENT FOR MAGNETIC BUCKLING ASSEMBLY

CROSS-REFERENCE TO RELATED APPLICATIONS

The present application is a continuation application of U.S. patent application Ser. No. 16/211,248, filed on Dec. 6, 2018, entitled MAGNETIC BUCKLING ASSEMBLY, which in turn claims a priority benefit of Chinese Application No. 201711284857.0, filed on Dec. 7, 2017, Chinese Application No. 201820665048.8, filed on May 3, 2018, and Chinese Application No. 201821544286.X, filed on Sep. 20, 2018. Each of the above-identified applications is incorporated herein by reference in its entirety.

BACKGROUND

1. Field of the Invention

The present invention relates to a buckling assembly, and more particularly, to a magnetic buckling assembly.

2. Description of the Prior Art

With development of economy and advancement of technology, there are more and more consumer goods available in the market for bringing convenience in people's lives. A baby carrier is one of these consumer goods.

It is well known that a baby carrier usually includes multiple straps and multiple buckling assemblies for quickly connecting or disconnecting the straps.

Currently, a conventional buckling assembly usually includes a male buckling component, a female buckling component and a releasing button. The male buckling component is connected to a strap, and the female buckling component is connected to another strap, so that the straps can be connected to each other by engagement of the male buckling component and the female buckling component. The releasing button is for disengaging the male buckling component from the female buckling component to disconnect the straps.

However, the conventional buckling assembly has drawbacks of difficult operation and complicated structure.

Therefore, there is a need to provide an improved buckling assembly with easy operation and compact structure for solving the aforementioned problems.

SUMMARY

It is an objective of the present invention to provide a magnetic buckling assembly with easy operation and compact structure.

In order to achieve the aforementioned objective, the present invention discloses a magnetic buckling assembly. The magnetic buckling assembly includes a male buckling component, a female buckling component, a first locking portion, a second locking portion, an operating component, a first magnetic component and a second magnetic component. The first locking portion is disposed on one of the male buckling component and the female buckling component. The second locking portion disposed on the other one of the male buckling component and the female buckling component and for engaging with the first locking portion. The operating component is movably disposed on the other one of the male buckling component and the female buckling component. The first magnetic component is disposed on the female buckling component. The second magnetic component is disposed on the male buckling component and for magnetically cooperating with the first magnetic component. The male buckling component is connected to the female buckling component along a connecting direction by engagement of the first locking portion and the second locking portion. The first magnetic component magnetically attracts or magnetically repulses the second magnetic component during a connecting process of the male buckling component and the female buckling component along the connecting direction. The first magnetic component magnetically attracts the second magnetic component for preventing separation of the male buckling component and the female buckling component or magnetically repulses the second magnetic component for promoting the separation of the male buckling component and the female buckling component when the operating component is operated to disengage the first locking portion from the second locking portion for allowing the separation of the male buckling component and the female buckling component. At least one clearance structure is formed on at least one of the second locking portion and the one of the male buckling component and the female buckling component for allowing the second locking portion to slide along an offsetting direction intersecting with the connecting direction to an offsetting position after the first locking portion engages with the second locking portion, and the one of the male buckling component and the female buckling component comprises an abutting portion for abutting against the second locking portion for preventing the separation of the male buckling component and the female buckling component when the second locking portion is located at the offsetting position.

According to an embodiment of the present invention, the second locking portion includes at least one first partition for engaging with the first locking portion and at least one second partition for abutting against the abutting portion. The at least one clearance structure includes a first clearance structure formed on the second locking portion, and the first clearance structure is a clearance slot.

According to an embodiment of the present invention, the one of the male buckling component and the female buckling component includes an outer cover and a buckling body disposed inside the outer cover. The first locking portion is disposed on the buckling body. A connecting hole is formed on a side of the outer cover for allowing the second locking portion to pass therethrough. The at least one clearance structure further includes a second clearance structure formed on the outer cover. The second clearance structure is a clearance hole communicated with the connecting hole, and the abutting portion is formed on the outer cover.

According to an embodiment of the present invention, the lateral wall of the clearance slot abuts against an inner wall of the clearance hole when the second locking portion is located at the offsetting position.

According to an embodiment of the present invention, a contacting surface of the lateral wall of the clearance slot and a contacting surface of the inner wall of the clearance hole are flat surfaces.

According to an embodiment of the present invention, the connecting hole is arc-shaped hole, and the clearance hole is a rectangular hole and communicated with the arc-shape hole.

According to an embodiment of the present invention, the abutting portion is located on an inner surface of the outer cover adjacent to the inner wall of the clearance hole.

According to an embodiment of the present invention, a notch is formed on the buckling body and corresponding to the clearance hole. The notch is parallel to the connecting direction. The at least one second partition of the second locking portion slides into the notch during an offsetting process of the second locking portion.

According to an embodiment of the present invention, two clearance structures are formed on the second locking portion and opposite to each other.

Furthermore, the present invention further discloses a magnetic buckling assembly. The magnetic buckling assembly includes a male buckling component, a female buckling component, a first locking portion, a second locking portion, an operating component, a first magnetic component, a second magnetic component and a protecting component. The first locking portion is disposed on one of the male buckling component and the female buckling component. The second locking portion is disposed on the other one of the male buckling component and the female buckling component and for engaging with the first locking portion. The operating component is movably disposed on the other one of the male buckling component and the female buckling component. The first magnetic component is disposed on the female buckling component. The second magnetic component is disposed on the male buckling component and for magnetically cooperating with the first magnetic component. The protecting component is disposed on the one of the male buckling component and the female buckling component and movable relative to the one of the male buckling component and the female buckling component between a first position and a second position. The protecting component restrains the operating component from disengaging the first locking portion from the second locking portion when the protecting component is located at the first position, and the operating component is allowed to disengage the first locking portion from the second locking portion when the protecting component is located at the second position. The male buckling component is connected to the female buckling component along a connecting direction by engagement of the first locking portion and the second locking portion. The first magnetic component magnetically attracts or magnetically repulses the second magnetic component during a connecting process of the male buckling component and the female buckling component along the connecting direction. The first magnetic component magnetically attracts the second magnetic component for preventing separation of the male buckling component and the female buckling component or magnetically repulses the second magnetic component for promoting the separation of the male buckling component and the female buckling component when the operating component is operated to disengage the first locking portion from the second locking portion for allowing the separation of the male buckling component and the female buckling component.

According to an embodiment of the present invention, the protecting component engages with the operating component when the protecting component is located at the first position, and the protecting component disengages from the operating component when the protecting component is located at the second position.

According to an embodiment of the present invention, the protecting component covers the operating component when the protecting component is located at the first position, and the operating component is exposed when the protecting component is located at the second position.

According to an embodiment of the present invention, the protecting component includes a covering portion and a guiding portion connected to the covering portion. The covering portion selectively covers or exposes the operating component. The guiding portion is movably disposed on the one of the male buckling component and the female buckling component, and the covering portion and the guiding portion are misaligned with each other along the connecting direction.

According to an embodiment of the present invention, at least one of the guiding portion and the covering portion is a hollow structure with an opening toward the other one of the male buckling component and the female buckling component.

According to an embodiment of the present invention, the operating component is slidably disposed on the one of the male buckling component and the female buckling component along an operating direction parallel to the connecting direction, and the protecting component is slidably disposed on the one of the male buckling component and the female buckling component along a sliding direction intersecting with the connecting direction.

According to an embodiment of the present invention, the protecting component is disposed on the one of the male buckling component and the female buckling component and slidable or rotatable relative to the one of the male buckling component and the female buckling component between the first position and the second position.

According to an embodiment of the present invention, the magnetic buckling assembly further includes a recovering component for biasing the protecting component to slide or rotate to the first position.

According to an embodiment of the present invention, the protecting component includes a first end and a second end. The first end of the protecting component is a resilient structure and connected to the one of the male buckling component and the female buckling component, and the second end of the protecting component is configured to cover or expose the operating component.

In summary, the present invention utilizes engagement of the first locking portion and the second locking portion for connecting the male buckling component to the female buckling component. Furthermore, the present invention further utilizes magnetic cooperation of the first magnetic component and the second magnetic component for securing connection between the male buckling component and the female buckling component. Therefore, the connection between the male buckling component and the female buckling component is more reliable. If the first magnetic component is configured to magnetically attract the second magnetic component, the male buckling component can still be connected to the female buckling component in a condition that the first locking portion and the second locking portion are disengaged from each other due to an operational mistake of the operating component, which provides better safety in use and prevents the male buckling component or the female buckling component from falling and missing due to disengagement of the male buckling component or the female buckling component. On the other hand, if the first magnetic component is configured to magnetically repulse the second magnetic component, the male buckling component can be connected to the female buckling component because the first locking portion and the second locking portion can be driven to abut against each other by magnetic repulsion of the first magnetic component and the second magnetic component, which makes the connection of the male buckling component and the female buckling component more reliable. Furthermore, the male buckling component can be driven to be separated from the female buckling component by the magnetic repulsion of the first magnetic component and the second magnetic component in a condition that the first locking portion and the second locking portion are disengaged from each other by the operating component, which provides convenience in use. Besides, the magnetic buckling assembly of the present invention also has an advantage of compact structure.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
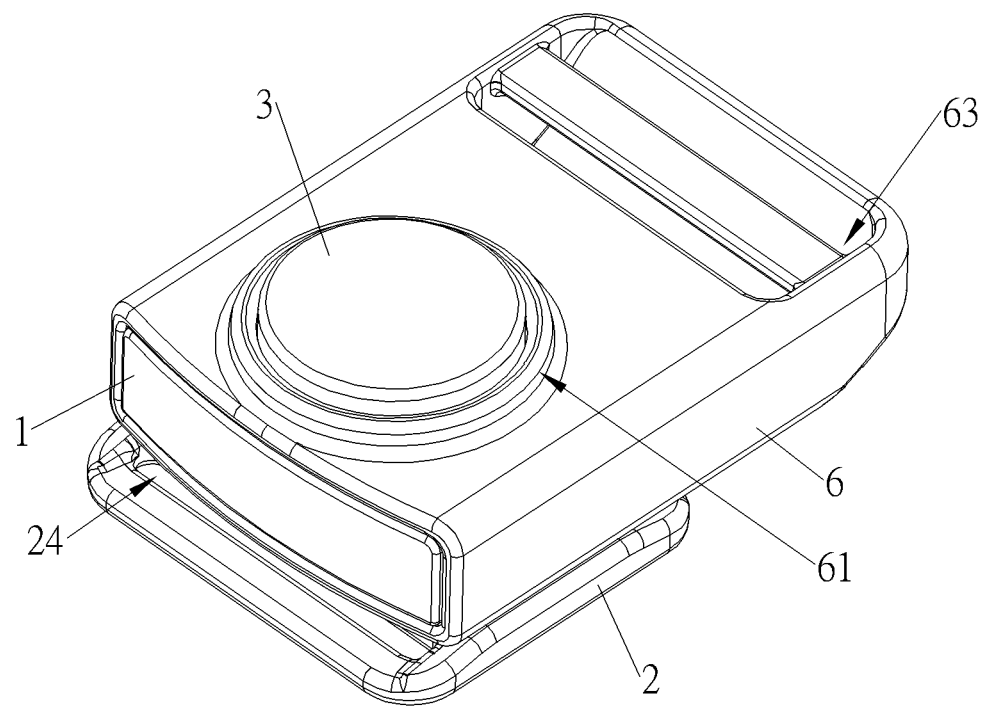
FIG. 1 and FIG. 2 are schematic diagrams of a magnetic buckling assembly at different views according to a first embodiment of the present invention.
Figure 2:
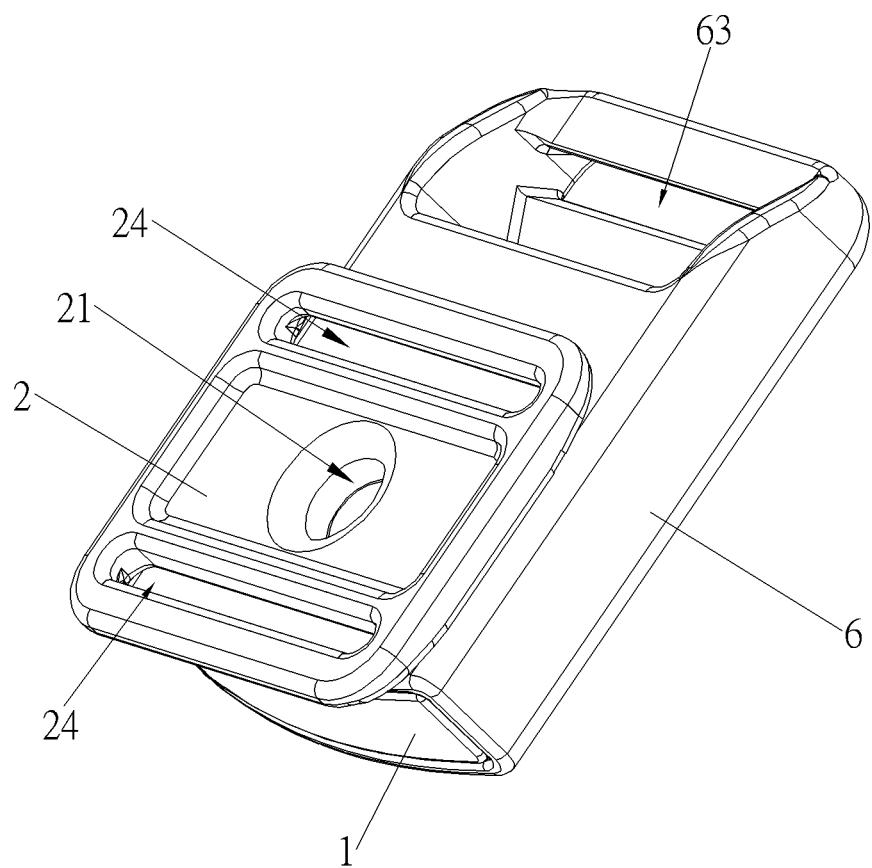
Figure 3:
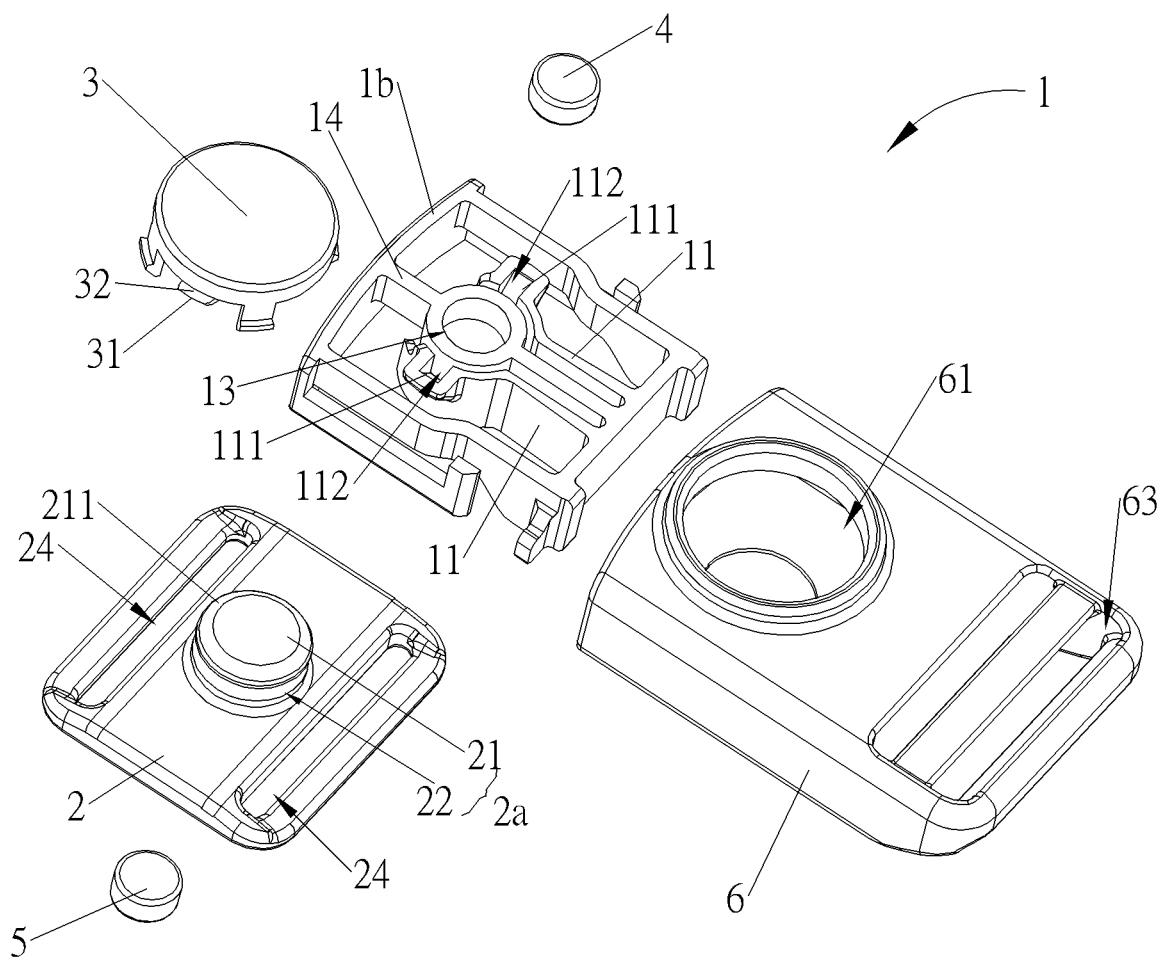
FIG. 3 is an exploded diagram of the magnetic buckling assembly according to the first embodiment of the present invention.
Figure 4:
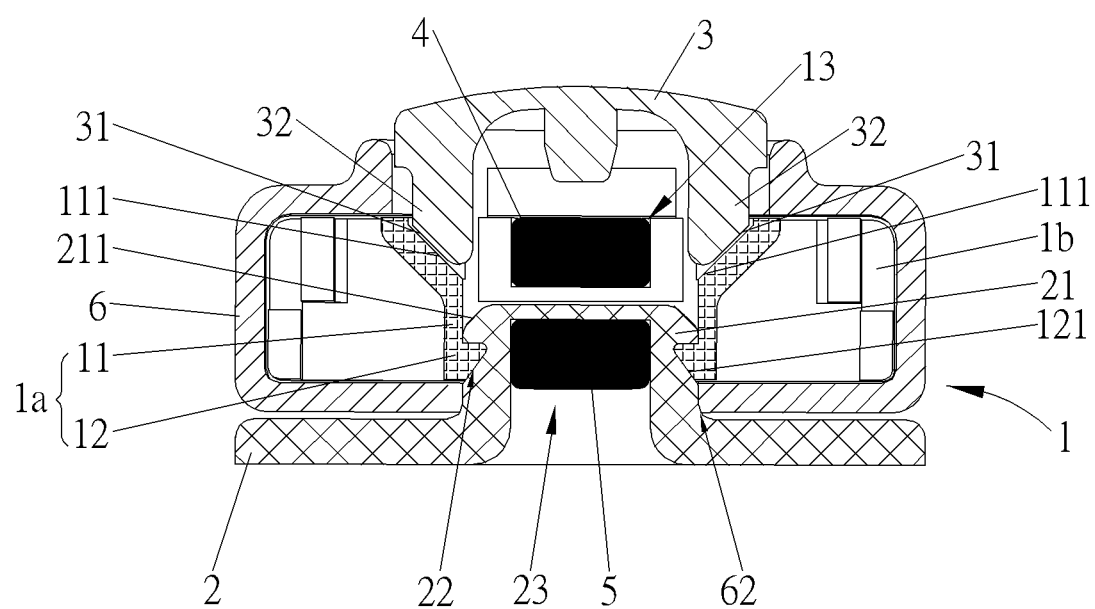
FIG. 4 is an internal structural diagram of the magnetic buckling assembly according to the first embodiment of the present invention.

Please refer to FIG. 1 to FIG. 4. FIG. 1 and FIG. 2 are schematic diagrams of a magnetic buckling assembly 100 at different views according to a first embodiment of the present invention. FIG. 3 is an exploded diagram of the magnetic buckling assembly 100 according to the first embodiment of the present invention. FIG. 4 is an internal structural diagram of the magnetic buckling assembly 100 according to the first embodiment of the present invention. As shown in FIG. 1 to FIG. 4, the magnetic buckling assembly 100 includes a female buckling component 1, a male buckling component 2, an operating component 3, a first magnetic component 4, a second magnetic component 5, a first locking portion 1a and a second locking portion 2a. In this embodiment, the first locking portion 1a and the first magnetic component 4 can be disposed on the female buckling component 1, and the second locking portion 2a and the second magnetic component 5 can be disposed on the male buckling component 2. The male buckling component 2 can be connected to the female buckling component 1 along a connecting direction by engagement of the first locking portion 1a and the second locking portion 2a. The operating component 3 can be movably disposed on the female buckling component 1 for disengaging the first locking portion 1a from the second locking portion 2a to allow separation of the male buckling component 2 and the female buckling component 1.

Furthermore, the first magnetic component 4 can be configured to magnetically attract the second magnetic component 5. Therefore, the first magnetic component 4 can magnetically attract the second magnetic component 5 during a connecting process of the male buckling component 2 and the female buckling component 1 along the connecting direction, which achieves a purpose of a quick connection of the male buckling component 2 and the female buckling component 1. Furthermore, the first magnetic component 4 can magnetically attract the second magnetic component 5 for preventing separation of the male buckling component 2 and the female buckling component 1 when the operating component 3 is operated to disengage the first locking portion 1a from the second locking portion 2a for allowing the separation of the male buckling component 2 and the female buckling component 1. However, it is not limited thereto. For example, in another embodiment, the first magnetic component can be configured to magnetically repulse the second magnetic component for driving the first locking portion to abut against the second locking portion when the male buckling component is connected to the female buckling component, which makes the connection of the male buckling component and the female buckling component more reliable. Furthermore, the male buckling component can be driven to be separated from the female buckling component by magnetic repulsion of the first magnetic component and the second magnetic component when the first locking portion and the second locking portion are disengaged from each other by the operating component, which provides convenience in use.

Specifically, in this embodiment, the female buckling component 1 can further include an outer cover 6 and a buckling body 1b. The buckling body 1b is disposed inside the outer cover 6, and the first locking portion 1a is disposed on the buckling body 1b. The operating component 3 movably passes through the outer cover 6 along the connecting direction, i.e., a vertical direction in FIG. 4. Preferably, in this embodiment, the operating component 3 can be a circular button for allowing a user to disengage the first locking portion 1a from the second locking portion 2a by pressing the operating component 3 easily. A disposing hole 61 is formed on a first side of the outer cover 6 away from the second locking portion 2a, i.e., an upper side of the outer cover 6 shown in FIG. 4, for allowing the operating component 3 to be disposed therein, and a connecting hole 62 is formed on a second side of the outer cover 6 adjacent to the second locking portion 2a, i.e., a lower side of the outer cover 6 shown in FIG. 4, for allowing the second locking portion 2a to pass therethrough to engage with the first locking portion 1a.

The outer cover 6 can not only make cooperation of the male buckling component 2 and the female buckling component 1 more reliable but also prevent wear damage of the male buckling component 2 or the female buckling component 1 caused by dust from environment, which extends a service life of the magnetic buckling assembly 100 and improves aesthetic appearance of the magnetic buckling assembly 100. However, it is not limited to this embodiment. For example, in another embodiment, the outer cover of the female buckling component can be omitted, i.e., the operating component can be directly disposed on the buckling body of the female buckling component. Alternatively, in another embodiment, the male buckling component can include an outer cover and a buckling body disposed inside the outer cover. The first locking portion and the second locking portion can be respectively disposed on the buckling body of the male buckling component and the buckling body of the female buckling component. The operating component can be correspondingly movably disposed on the outer cover of the male buckling component for disengaging the first locking portion from the second locking portion.

Figure 5:
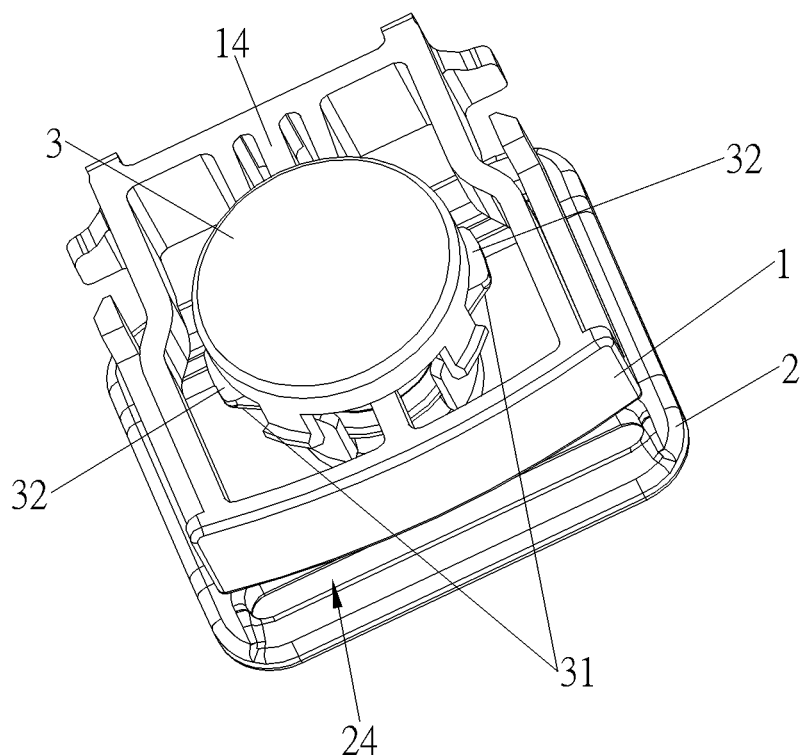
FIG. 5 is a diagram of the magnetic buckling assembly without illustrating an outer cover according to the first embodiment of the present invention.
Figure 6:
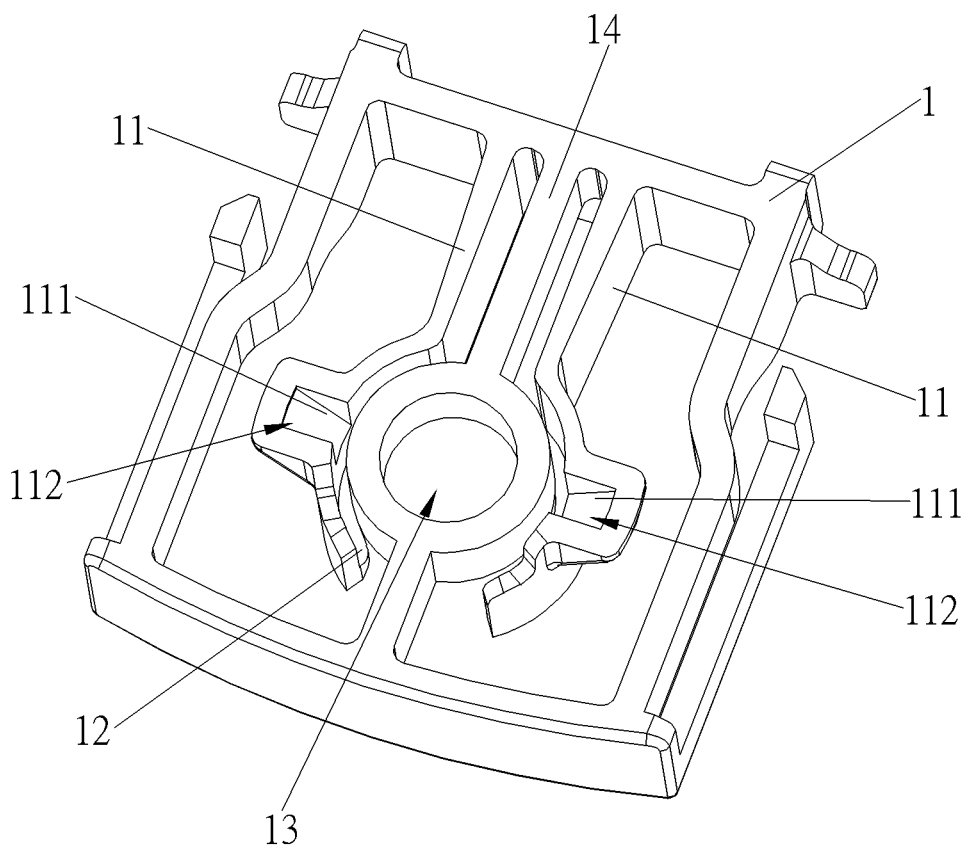
FIG. 6 is a partial diagram of a female buckling component according to the first embodiment of the present invention.

Please refer to FIG. 3 to FIG. 6. FIG. 5 is a diagram of the magnetic buckling assembly 100 without illustrating the outer cover 6 according to the first embodiment of the present invention. FIG. 6 is a partial diagram of the female buckling component 1 according to the first embodiment of the present invention. As shown in FIG. 3 to FIG. 6, the first locking portion 1a is a resilient structure. The second locking portion 2a includes an abutting structure 21 and an engaging structure 22. The abutting structure 21 can push and resiliently deform the first locking portion 1a during the connecting process of the male buckling component 2 and the female buckling component 1 along the connecting direction, so that the first locking portion 1a can slide to engage with the engaging structure 22. Therefore, the abutting structure 21 allows the engaging structure 22 to engage with the first locking portion 1a easily and smoothly. Furthermore, the operating component 3 can be operated to resiliently deform the first locking portion 1a to disengage the first locking portion 1a from the engaging structure 22.

Specifically, the first locking portion 1a includes two resilient arms 11 and two engaging heads 12. Each engaging head 12 is connected to the corresponding resilient arm 11 for engaging with the engaging structure 22. Preferably, as shown in FIG. 3, in this embodiment, each resilient arm 11 and the corresponding engaging head 12 can be an integrally formed structure, and the two engaging heads 12 can be hung inside a middle portion of the female buckling component 1 by the two resilient arms 11, so that the two resilient arms 11 can reliably drive the two engaging heads 12 to move. The two resilient arms 11 are for biasing the two engaging heads 12 to engage with the engaging structure 22. Therefore, the abutting structure 21 pushes the two engaging heads 12 to resiliently deform the two resilient arms 11 during the connecting process of the male buckling component 2 and the female buckling component 1 along the connecting direction, so that the two engaging heads 12 can slide to engage with the engaging structure 22, which achieves a purpose of automatic engagement of the male buckling component 2 and the female buckling component 1 during the connecting process of the male buckling component 2 and the female buckling component 1.

Furthermore, the operating component 3 is operated to resiliently deform the two resilient arms 11 to disengage the two engaging heads 12 from the engaging structure 22. Preferably, in this embodiment, the operating component 3 can be operated to push the two resilient arms 11 along an operating direction parallel to the connecting direction to resiliently deform the two resilient arms 11 along two deforming directions intersecting with the connecting direction to disengage the two engaging heads 12 from the engaging structure 22, which facilitates disengagement of the two engaging heads 12 and the engaging structure 22.

Preferably, in this embodiment, the two resilient arms 11 can surround the second locking portion 2a cooperatively, and the two engaging heads 12 can surround the engaging structure 22 cooperatively. Such configuration can make engagement of the two engaging heads 12 and the engaging structure 22 more reliable, which secures the connection of the male buckling component 2 and the female buckling component 1. However, it is not limited to this embodiment. For example, in another embodiment, the numbers of the resilient arm and the engaging head also can be one, three, four or five.

Preferably, in this embodiment, each engaging head 12 can be a hook, and the engaging structure 22 can be a hook slot corresponding to the hook, so that the male buckling component 2 can be connected to the female buckling component 1 firmly by the engagement of the hook and the hook slot. Furthermore, the buckling body 1b of the female buckling component 1 can be a hollow structure, and the female buckling component 1 can further include a supporting arm 14 located in a middle portion of the buckling body 1b of the female buckling component 1 and between the two resilient arms 111 and connected to two opposite sides of the buckling body 1b of the female buckling component 1 for reinforcing structural strength of the female buckling component 1.

As shown in FIG. 3 to FIG. 6, an end of the abutting structure 21 includes a first inclined structure 211 inclined relative to the connecting direction. Each engaging head 12 includes a second inclined structure 121 cooperating with the first inclined structure 211. The abutting structure 21 can slide across the two engaging heads 12 to engage the engaging structure 22 with the two engaging heads 12 easily by cooperation of the first inclined structure 211 and the second inclined structures 121, which facilitates the connection of the male buckling component 2 and the female buckling component 1.

Furthermore, the operating component 3 includes two abutting inclined surfaces 31 inclined relative to the connecting direction, and the operating component 3 can be operated to push and resiliently deform the two resilient arms 11 by the two abutting inclined surfaces 31, so as to disengage the two engaging heads 12 from the engaging structure 22. Since the two engaging heads 12 surround the engaging structure 22 cooperatively, each abutting inclined surface 31 can be configured to be inclined away from the corresponding engaging head 12 from inside to outside. Therefore, the operating component 3 can be operated to push and resiliently spread the two resilient arms 11 outwardly by the two abutting inclined surfaces 31, which achieves a purpose of driving the two engaging heads 12 to move outwardly to disengage from the engaging structure 22 by the two resilient arms 11. However, it is not limited to this embodiment. For example, in another embodiment, each engaging head also can be driven to move inwardly to disengage from the engaging structure by the two resilient arms.

Besides, two expanding legs 32 extend from the operating component 3 along the connecting direction, and each abutting inclined surface 31 is formed on the corresponding expanding leg 32. The first locking portion 1a includes two driven inclined surfaces 111. Each driven inclined surface 111 is disposed on a proximal end of the corresponding resilient arm 11 connected to the corresponding engaging head 12 for cooperating with the corresponding abutting inclined surface 31. The operating component 3 can be operated to push and resiliently deform the two resilient arms 11 by cooperation of the two abutting inclined surfaces 31 and the two driven inclined surfaces 111, so as to disengage the two engaging heads 12 from the engaging structure 22. Preferably, in this embodiment, a recess 112 can be formed on the proximal end of each resilient arm 11 connected to the corresponding engaging head 12. Each expanding leg 32 extends into the corresponding recess 112. Each driven inclined surface 111 is formed on a wall of the corresponding recess 112. Each abutting inclined surface 31 is formed on an end of the corresponding expanding leg 32. Such configuration allows the operating component 3 to be operated easily to push and deform the two resilient arms 11. Furthermore, since the two expanding legs 32 can directly cooperate with the two driven inclined surfaces 111 on the two recesses 112 adjacent to the proximal ends of the two resilient arms 11, it allows the two resilient arms 11 to deform quickly, so as to quickly disengage the two engaging heads 12 from the engaging structure 22. Besides, the operating component 3 can be driven to recover by the two resilient arms 11 because of the cooperation of the abutting inclined surfaces 31 of the expanding legs 32 and the proximal ends of the resilient arms 11. However, it is not limited thereto. For example, in another embodiment, the numbers of abutting inclined surface, the expanding leg, the recess and the driven inclined surface also can be one if there is only one resilient arm.

As shown in FIG. 3, FIG. 4 and FIG. 6, a first installation chamber 13 is formed on the female buckling component 1, and a second installation chamber 23 is formed on the male buckling component 2. The first magnetic component 4 is installed into the first installation chamber 13, and the second magnetic component 5 is installed into the second installation chamber 23, so that the first magnetic component 4 and the second magnetic component 5 can be hidden inside the female buckling component 1 and the male buckling component 2, respectively. Specifically, in this embodiment, the first installation chamber 13 can be aligned with the second installation chamber 23 along the connecting direction, so as to maximize the magnetic cooperation of the first magnetic component 4 and the second magnetic component 5, which achieves a purpose of the quick connection of the male buckling component 2 and the female buckling component 1 and a purpose of preventing separation of the male buckling component 2 and the female buckling component 1. In this embodiment, the second installation chamber 23 can be formed inside the second locking portion 2a, the first installation chamber 13 can be formed inside the middle portion of the female buckling component 1, and more specifically in a middle portion of the supporting arm 14, which makes structure of the magnetic buckling assembly 100 reasonable and compact for achieving a purpose of saving material.

Furthermore, in this embodiment, each of the first magnetic component 4 and the second magnetic component 5 can be a permanent magnetic component. However, it is not limited to this embodiment. For example, in another embodiment, one of the first magnetic component and the second magnetic component can be a permanent magnetic component, and the other one of the first magnetic component and the second magnetic component can be a conductive magnetic component, such as a metal structure. Preferably, a thickness of the first magnetic component 4 can be from 3.0 to 5.5 millimeters. More preferably, the thickness of the first magnetic component 4 can be 3.0, 3.8, 4.5, 5.0 or 5.5 millimeters. In this embodiment, the thickness of the first magnetic component 4 can be 3.8 millimeters. It should be noticed that, in another embodiment, the first installation chamber can be formed inside the second locking portion if the second locking portion is disposed on the female buckling component.

As shown in FIG. 1, FIG. 2, FIG. 3 and FIG. 5, each of the male buckling component 2 and the outer cover 6 includes at least one assembling portion for installing at least one strap. Preferably, the male buckling component 2 can include two assembling portions opposite to each other, and the outer cover 6 can include one assembling portion. The assembling portion of the outer cover 6 can be always misaligned with one of the two assembling portions of the male buckling component 2 for easy assembly of the straps. Specifically, a through hole 24 can be formed on each of the two assembling portions of the male buckling component 2, and a through hole 63 can be formed on the assembling portions of the outer cover 6. The male buckling component 2 can be fixed to a first cloth surface, which is not shown in figures, by passing the straps through the two assembling portions of the male buckling component 2. The female buckling component 1 can be fixed on a second cloth surface, which is not shown in figures, by passing the straps through the assembling portion of the outer cover 6. Therefore, the first cloth surface can be detachably connected to the second cloth surface by the magnetic buckling assembly 100.

In this embodiment, the second locking portion 2a can be a column structure, so that the male buckling component 2 is rotatable relative to the female buckling component 1 around the second locking portion 2a, which brings flexibility in use. Positions of the two assembling portions relative to the outer cover 6 are adjustable by rotation of the male buckling component 2 relative to the female buckling component 1, and therefore, any one of the two assembling portions of the male buckling component 2 can be used together with the assembling portion of the outer cover 6. If one of the two assembling portions of the male buckling component 2 is broken, the other one of two assembling portions of the male buckling component 2 can be used together with the assembling portion of the outer cover 6 by the rotation of the male buckling component 2 relative to the female buckling component 1, which makes the magnetic buckling assembly 100 more durable.

As shown in FIG. 1 to FIG. 6, operational principle of the magnetic buckling component 100 of this embodiment is provided as follows. When it is desired to separate or disconnect the male buckling component 2 from the female buckling component 1, the operating component 3 can be pressed downwardly to drive the expanding legs 32 to push the driven inclined surfaces 111 on the recesses 112 on the resilient arms 11. By the cooperation of the abutting inclined surfaces 31 on the expanding legs 32 and the driven inclined surfaces 111 on the recesses 112, the resilient arms 11 can resiliently spread outwardly to drive the engaging heads 12 connected to the resilient arms 11 to move outwardly to disengage from the engaging structure 22 of the second locking portion 2a for allowing the separation of the female buckling component 1 and the male buckling component 2. At this moment, the male buckling component 2 is still connected to the female buckling component 1 by magnetic attraction of the first magnetic component 4 and the second magnetic component 5. Afterwards, as long as the female buckling component 1 and the male buckling component 2 are pulled away from each other to overcome the magnetic attraction of the first magnetic component 4 and the second magnetic component 5, the female buckling component 1 can be separated or disconnected from the male buckling component 2.

When it is desired to connect the male buckling component 2 to the female buckling component 1, it only has to move the male buckling component 2 and the female buckling component 1 to align the second locking portion 2a with the connecting hole 62 on the outer cover 6 and then to move the male buckling component 2 and the female buckling component 1 toward each other. By the magnetic attraction of the first magnetic component 4 and the second magnetic component 5, the abutting structure 21 of the second locking portion 2a can slide across the engaging heads 12, so that the engaging structure 22 and the engaging heads 12 can be engaged with each other, which achieves a purpose of the connection of the male buckling component 2 and the female buckling component 1 as shown in FIG. 4.

Figure 7:
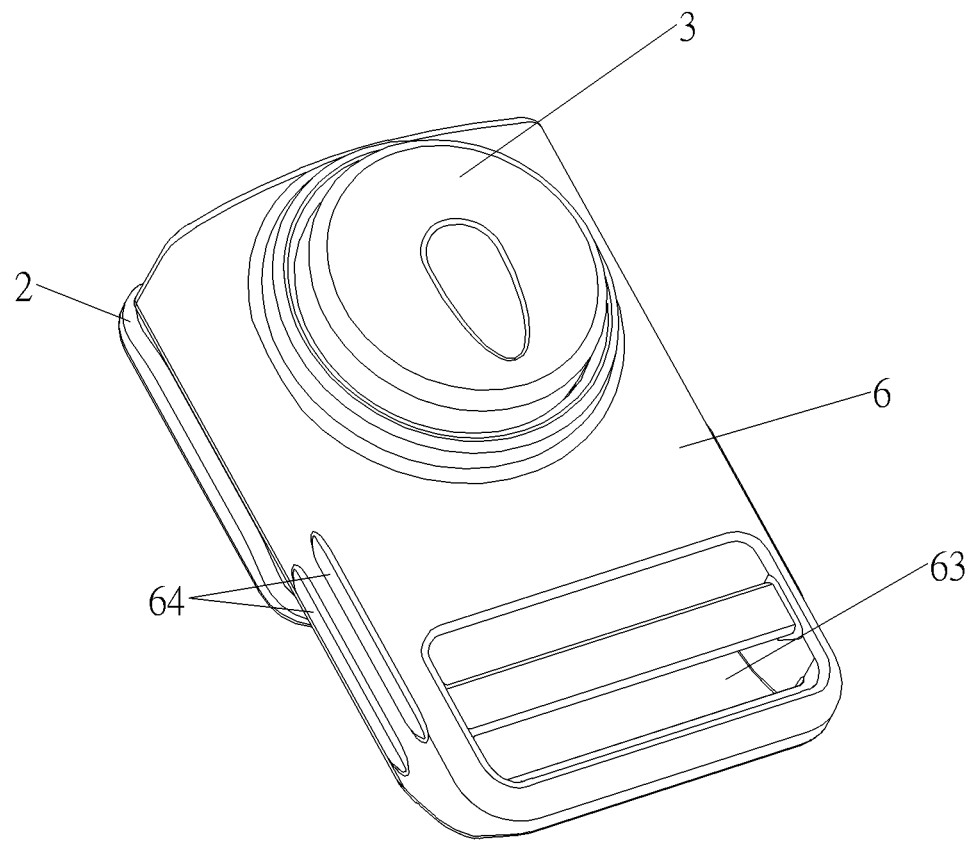
FIG. 7 and FIG. 8 are schematic diagrams of a magnetic buckling assembly at different views according to a second embodiment of the present invention.
Figure 8:
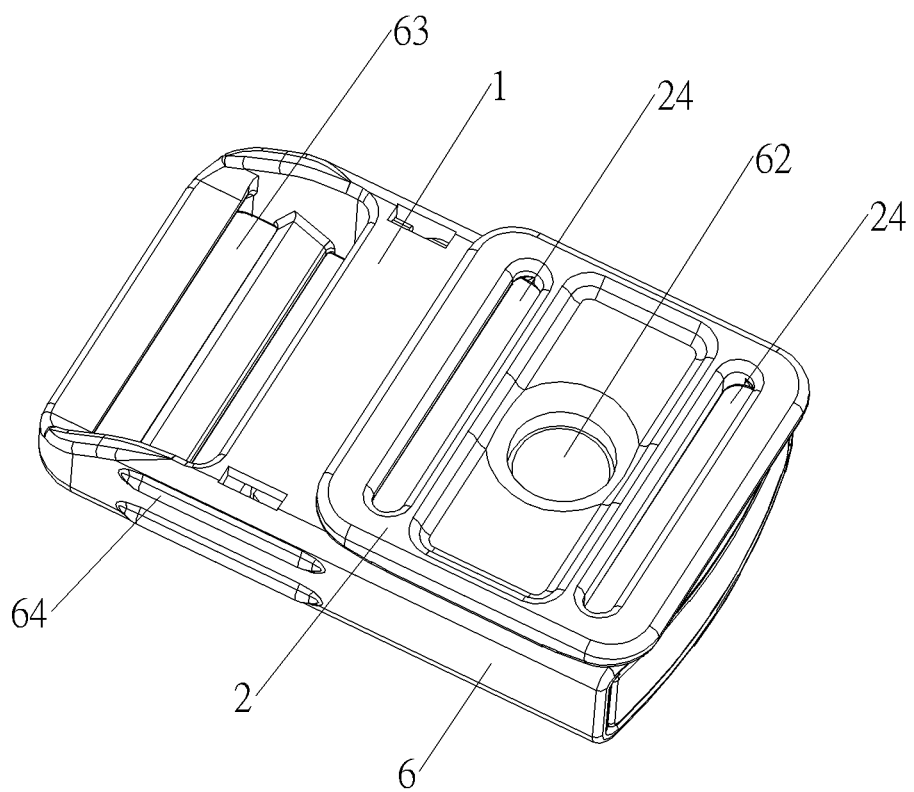
Figure 9:
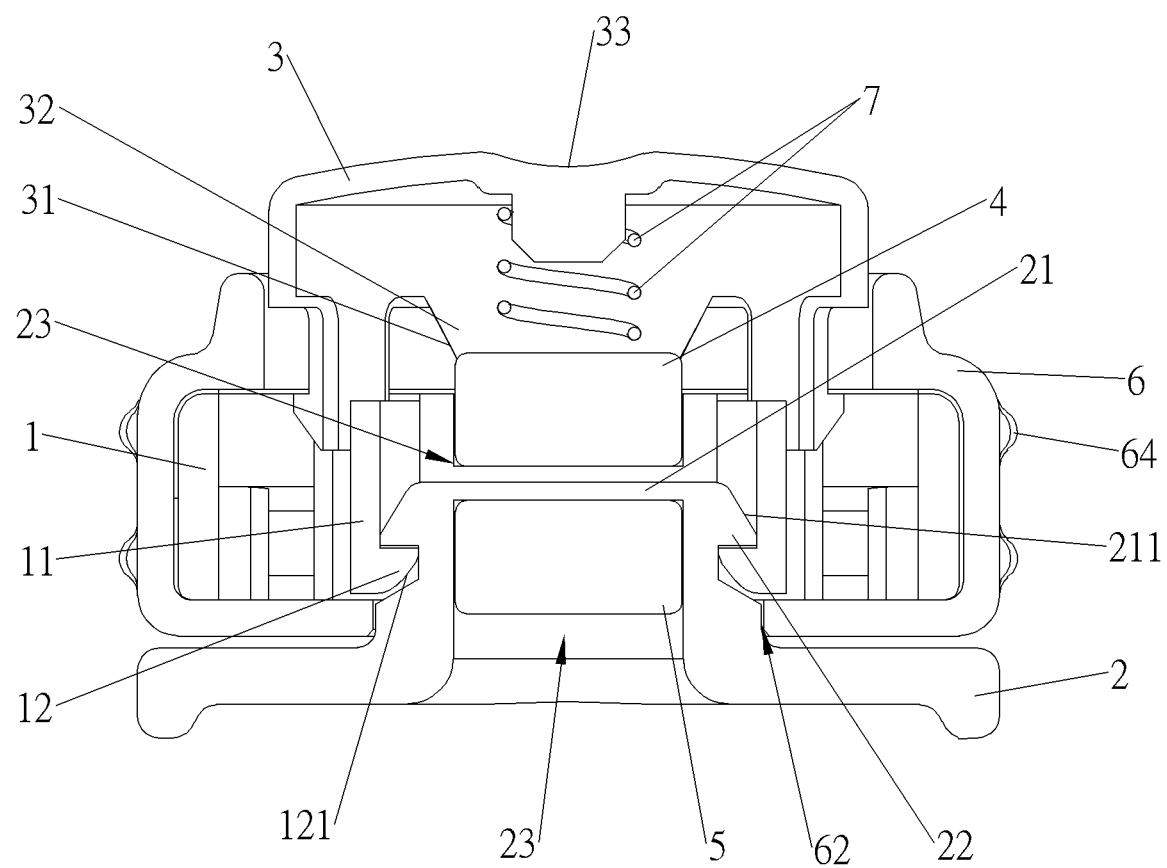
FIG. 9 is an internal structural diagram of the magnetic buckling assembly according to the second embodiment of the present invention.
Figure 10:
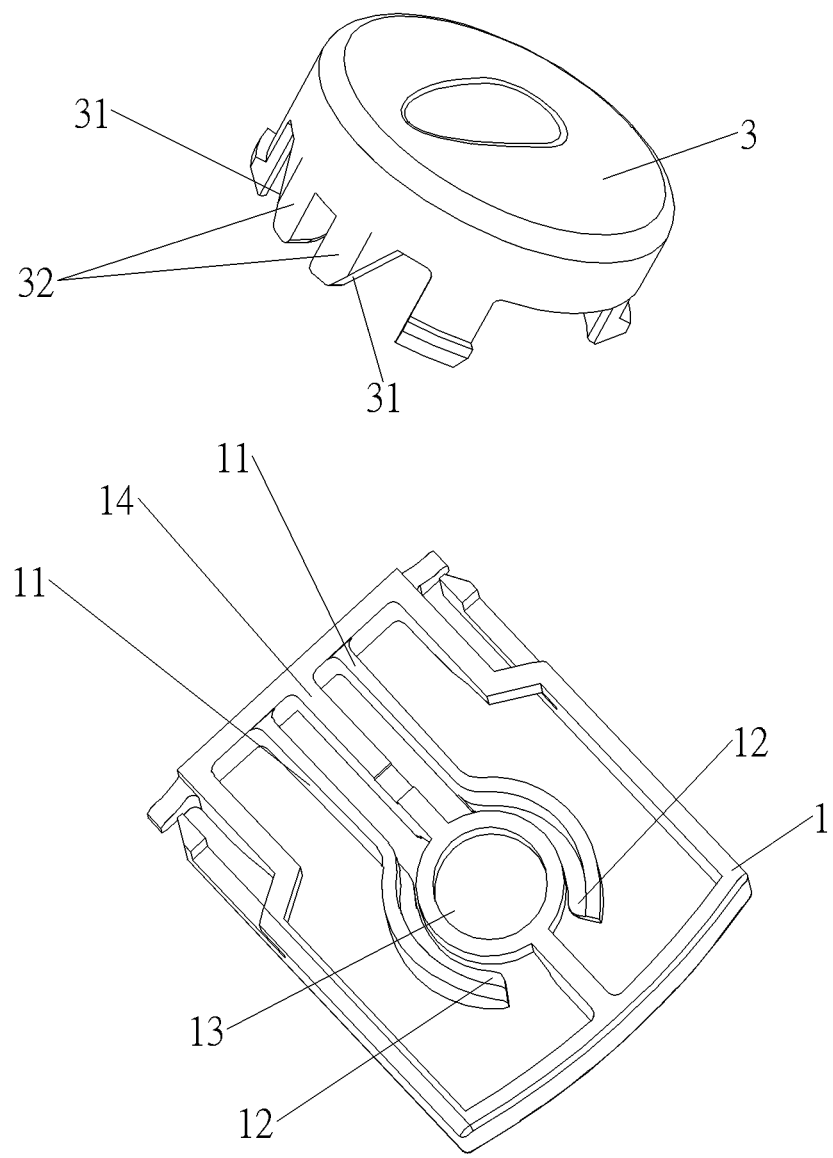
FIG. 10 is a partial exploded diagram of the magnetic buckling assembly according to the second embodiment of the present invention.

Please refer to FIG. 7 to FIG. 10. FIG. 7 and FIG. 8 are schematic diagrams of a magnetic buckling assembly 100a at different views according to a second embodiment of the present invention. FIG. 9 is an internal structural diagram of the magnetic buckling assembly 100a according to the second embodiment of the present invention. FIG. 10 is a partial exploded diagram of the magnetic buckling assembly 100a according to the second embodiment of the present invention. As shown in FIG. 7 to FIG. 10, different from the first embodiment, a plurality of ribs 64 protrude from two opposite lateral walls of the outer cover 6 of this embodiment for providing friction to facilitate the user to operate the magnetic buckling assembly 100a easily. However, it is not limited to this embodiment. For example, in another embodiment, the number of the rib can be one. Furthermore, in this embodiment, the abutting inclined surface 31 on each expanding leg 32 is located adjacent to a distal end of the corresponding resilient arm 11 away from the corresponding engaging head 12 for cooperating with the distal end of the corresponding resilient arm 11. In other words, each expanding leg 32 is located between the corresponding resilient arm 11 and the supporting arm 14 and directly cooperates with the distal end of the corresponding resilient arm 11, and therefore, the driven inclined surface 111 and the recess 112 can be omitted in this embodiment. Furthermore, the supporting arm 14 of this embodiment can be configured to engage with a gap between the two expanding legs 32 spaced from each other.

Besides, in this embodiment, since each expanding leg 32 directly cooperates with the distal end of the corresponding resilient arm 11, recovering forces generated by the two resilient arms 11 might be too small to recover the operating component 3. Therefore, the magnetic buckling assembly 100a can further include a resilient component 7 for providing a recovering resilient force to recover the operating component 3. Preferably, the resilient component 7 can be an elastic spring abutting between the operating component 3 and the female buckling component 1 and be aligned with the first installation chamber 13. However, it is not limited thereto. For example, in another embodiment, the resilient component also can be a resilient structure made of plastic material. Besides, the thickness of the first magnetic component 4 of this embodiment can be 5.0 millimeters.

Other structure of the magnetic buckling assembly 100a of this embodiment is similar to the one of the magnetic buckling assembly 100 of the first embodiment. Detailed description is omitted herein for simplicity.

As shown in FIG. 7 to FIG. 10, operational principle of the magnetic buckling assembly 100a of this embodiment is provided as follows. When it is desired to separate or disconnect the male buckling component 2 from the female buckling component 1, the operating component 3 can be pressed downwardly to resiliently compress the resilient component 7. During the aforementioned process, the abutting inclined surfaces 31 on the expanding legs 32 of the operating component 3 cooperate with the distal ends of the resilient arms 11 away from the engaging head 12, so that the resilient arms 11 spread outwardly to drive the engaging heads 12 connected to the resilient arms 11 to move outwardly to disengage from the engaging structure 22 of the second locking portion 2a for allowing the separation of the male buckling component 2 and the female buckling component 1. At this moment, the male buckling component 2 is still connected to the female buckling component 1 by the magnetic attraction of the first magnetic component 4 and the second magnetic component 5. Afterwards, as long as the female buckling component 1 and the male buckling component 2 are pulled away from each other to overcome the magnetic attraction of the first magnetic component 4 and the second magnetic component 5, the female buckling component 1 can be separated or disconnected from the male buckling component 2.

When it is desired to connect the male buckling component 2 to the female buckling component 1, it only has to move the male buckling component 2 and the female buckling component 1 to align the second locking portion 2a with the connecting hole 62 on the outer cover 6 and then to move the male buckling component 2 and the female buckling component 1 toward each other. By the magnetic attraction of the first magnetic component 4 and the second magnetic component 5, the abutting structure 21 of the second locking portion 2a can slide across the engaging heads 12, so that the engaging structure 22 and the engaging heads 12 can be engaged with each other, which achieves a purpose of the connection of the male buckling component 2 and the female buckling component 1.

Figure 11:
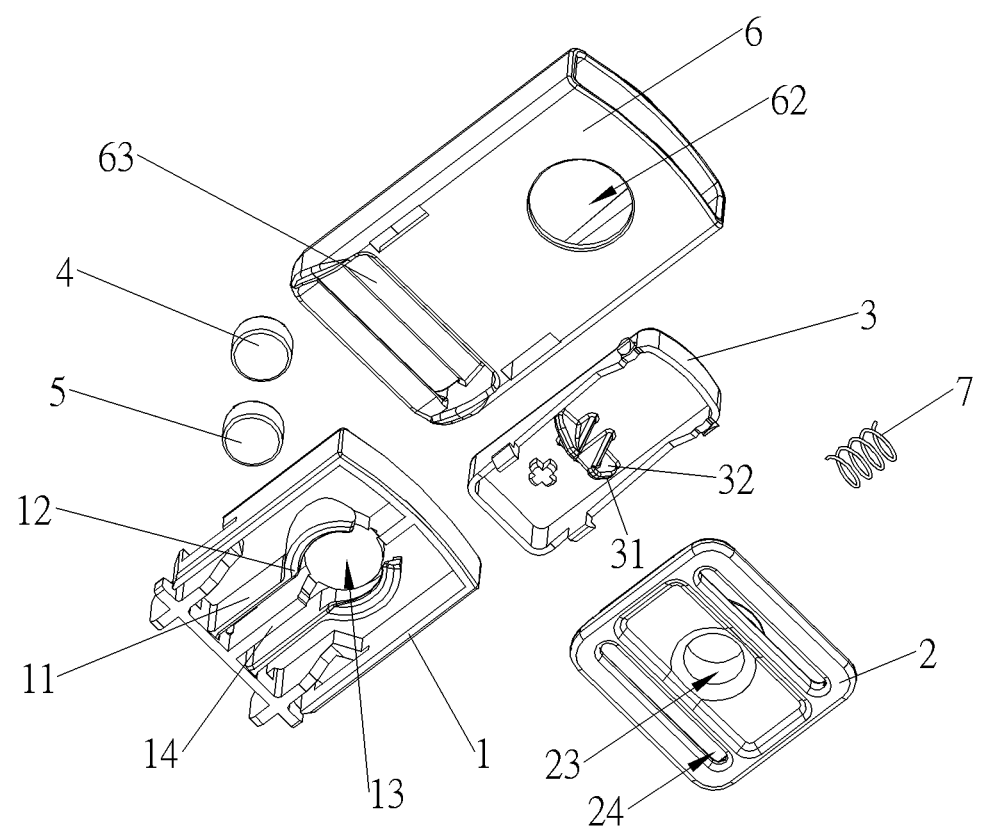
FIG. 11 and FIG. 12 are exploded diagrams of a magnetic buckling assembly at different views according to a third embodiment of the present invention.
Figure 12:
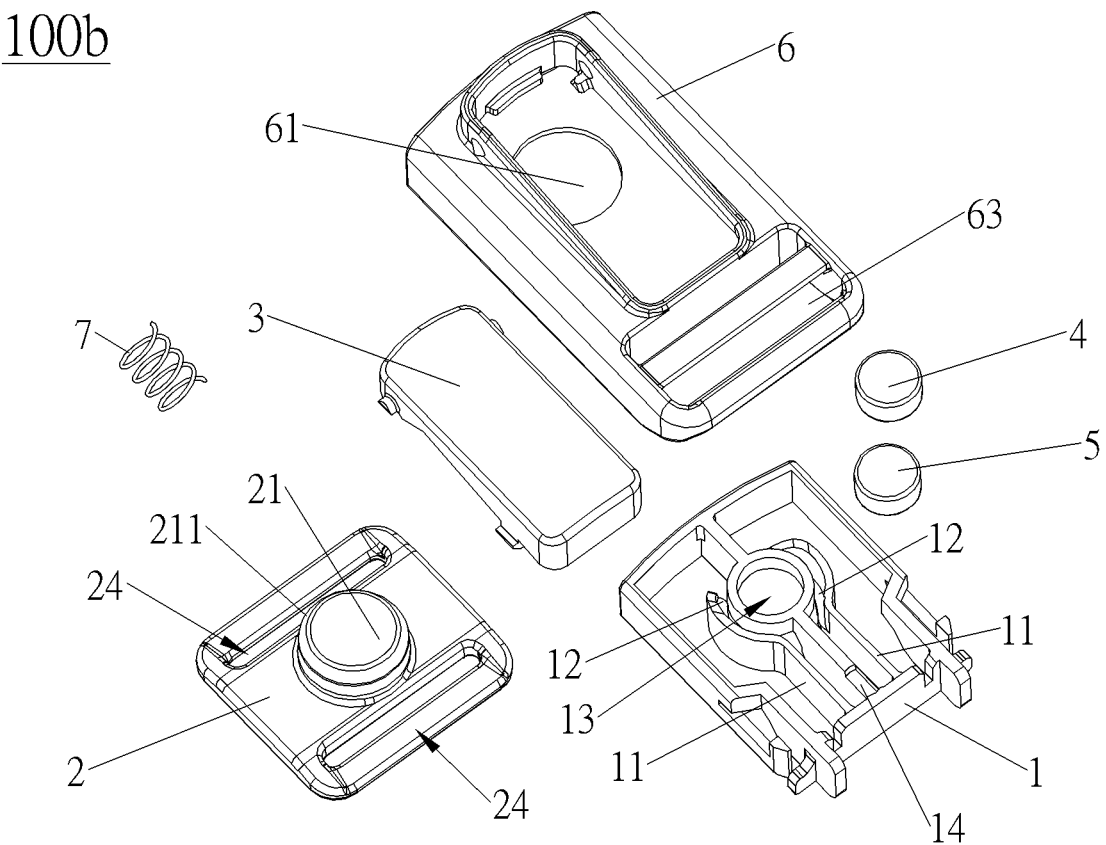
Figure 13:
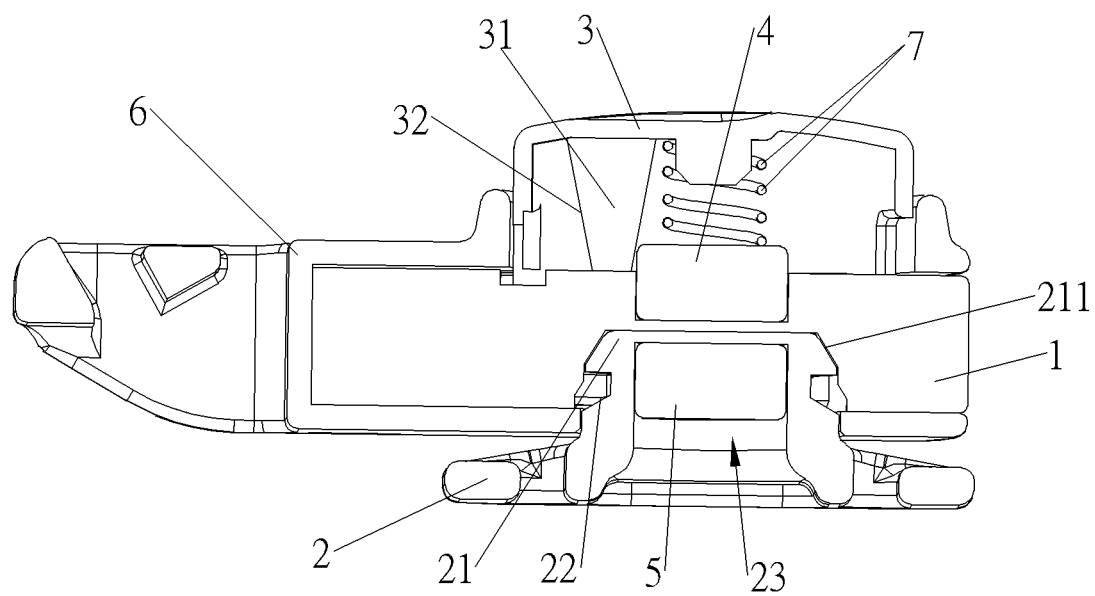
FIG. 13 is an internal structural diagram of the magnetic buckling assembly according to the third embodiment of the present invention.

Please refer to FIG. 11 to FIG. 13. FIG. 11 and FIG. 12 are exploded diagrams of a magnetic buckling assembly 100b at different views according to a third embodiment of the present invention. FIG. 13 is an internal structural diagram of the magnetic buckling assembly 100b according to the third embodiment of the present invention. As shown in FIG. 11 to FIG. 13, different from the aforementioned embodiments, the operating component 3 of this embodiment can be a rectangular button. Furthermore, the rib can be omitted in this embodiment. Besides, the resilient component 7 of this embodiment can abut between the operating component 3 and the female buckling component 1 and be misaligned with the first installation chamber 13.

Other structure and operational principle of the magnetic buckling assembly 100b of this embodiment are similar to the ones of the magnetic buckling assembly 100a of the second embodiment. Detailed description is omitted herein for simplicity.

Figure 14:
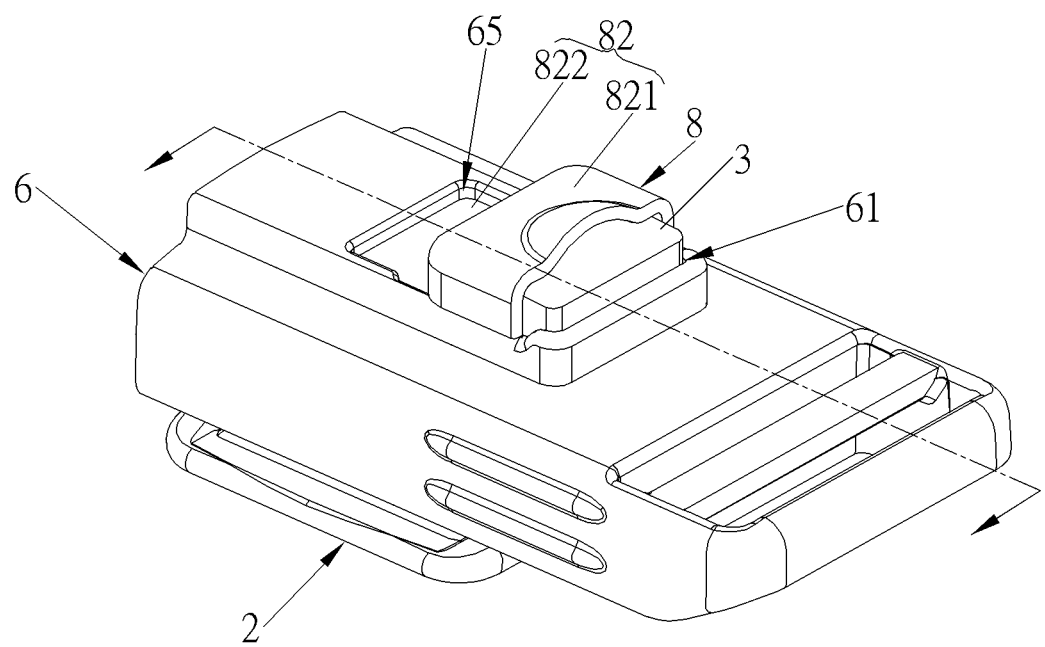
FIG. 14 is a schematic diagram of a magnetic buckling assembly according to a fourth embodiment of the present invention.
Figure 15:
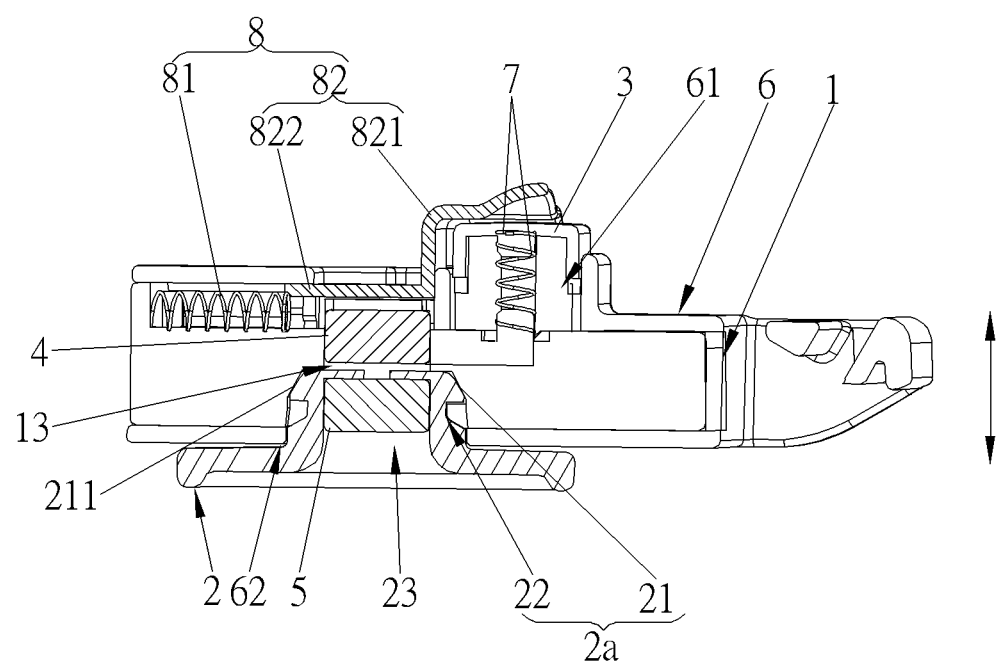
FIG. 15 is a sectional diagram of the magnetic buckling assembly according to the fourth embodiment of the present invention.
Figure 16:
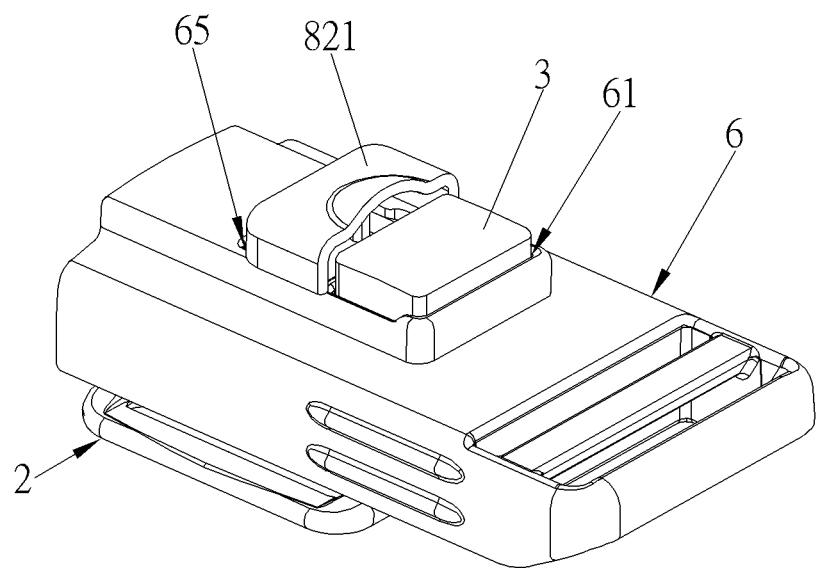
FIG. 16 to FIG. 18 are schematic diagrams of the magnetic buckling assembly in different states according to the fourth embodiment of the present invention.
Figure 17:
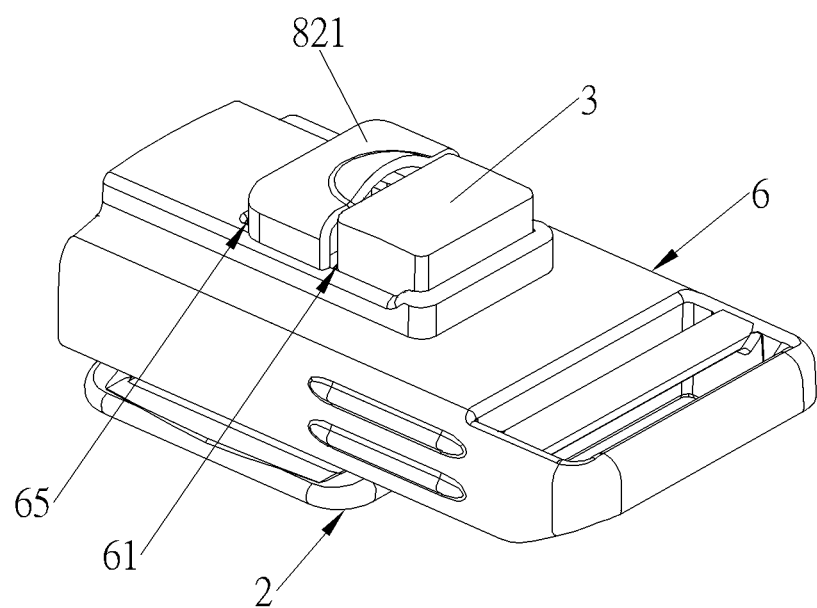
Figure 18:
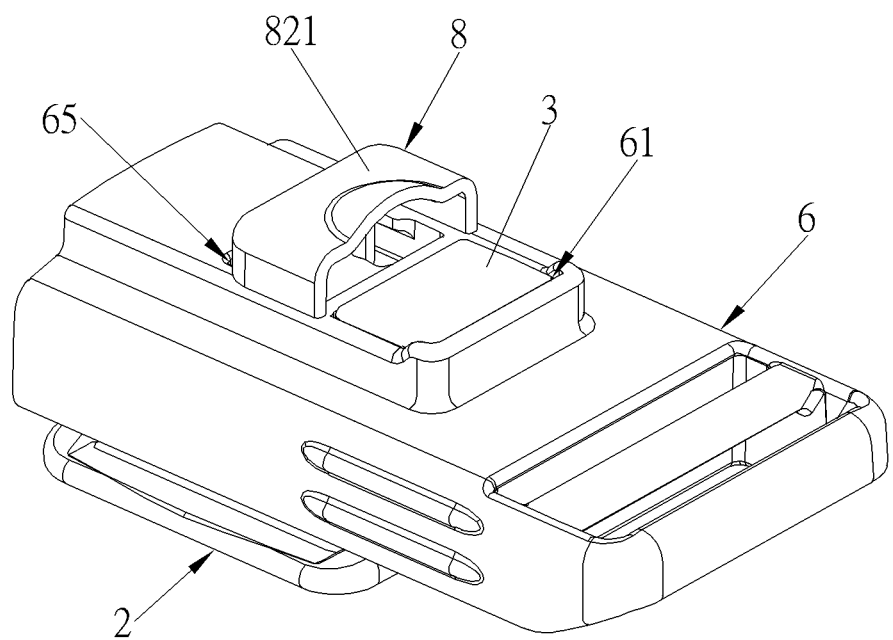
Figure 19:
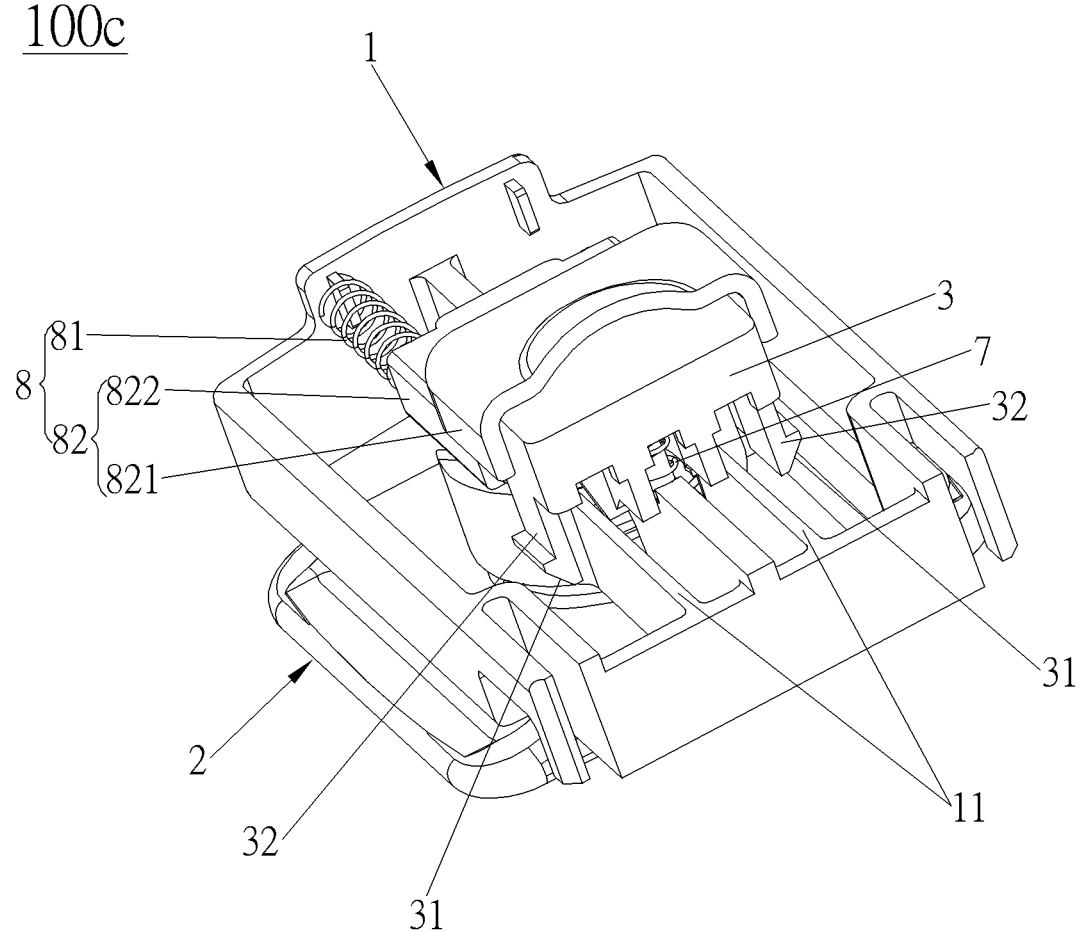
FIG. 19 is a partial diagram of the magnetic buckling assembly according to the fourth embodiment of the present invention.
Figure 20:
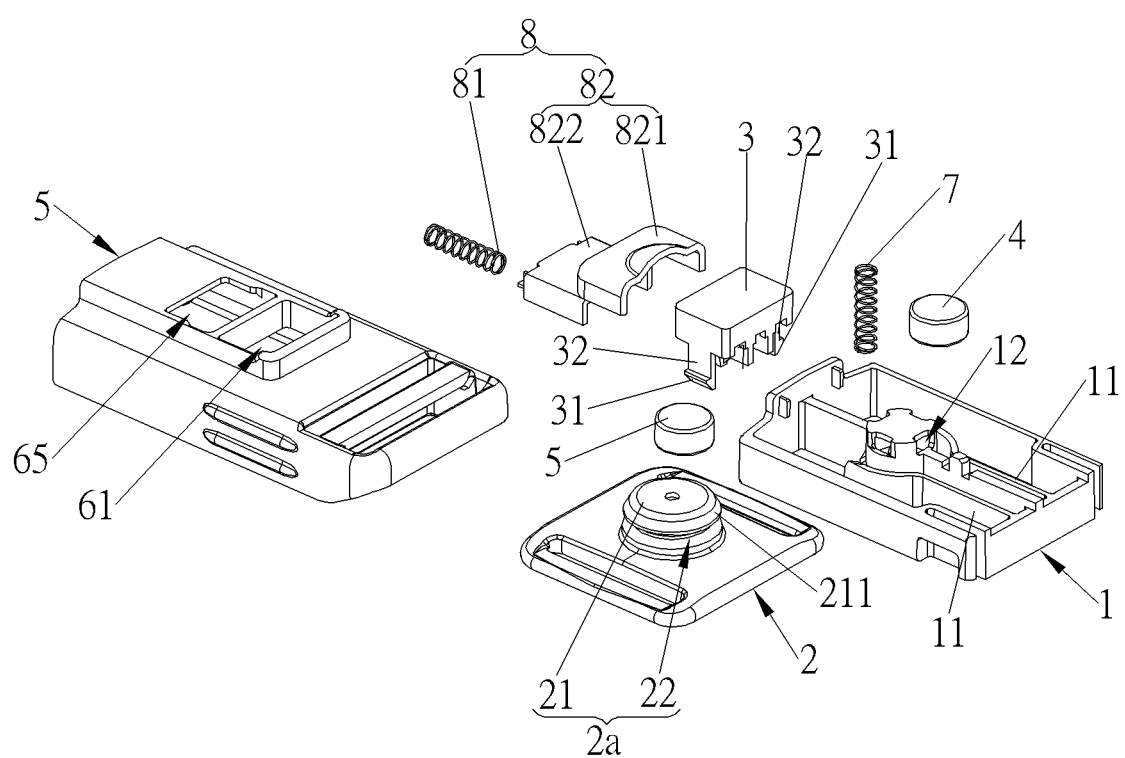
FIG. 20 is an exploded diagram of the magnetic buckling assembly according to the fourth embodiment of the present invention.
Figure 21:
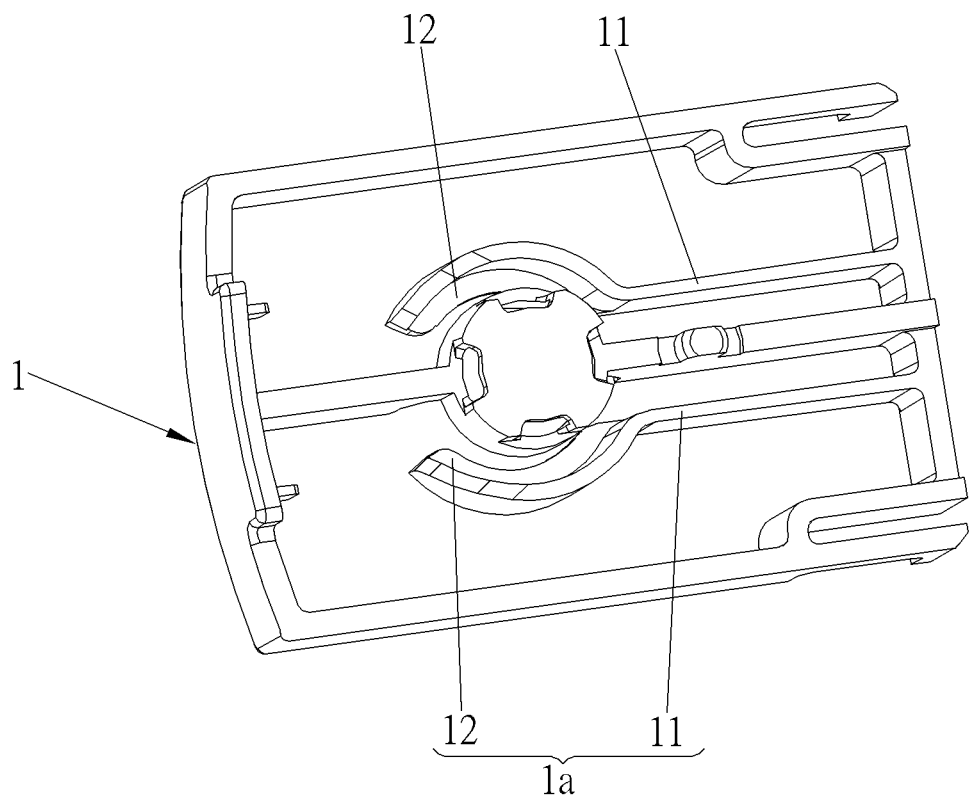
FIG. 21 is a partial diagram of a female buckling component according to the fourth embodiment of the present invention.
Figure 22:
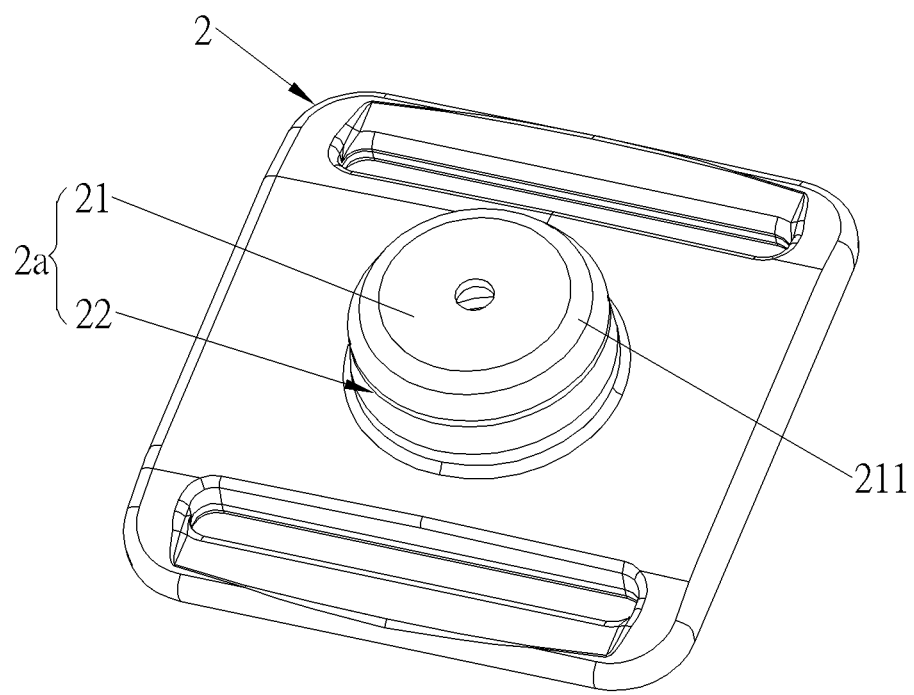
FIG. 22 is a diagram of a male buckling component according to the fourth embodiment of the present invention.

Please refer to FIG. 14 to FIG. 22. FIG. 14 is a schematic diagram of a magnetic buckling assembly 100c according to a fourth embodiment of the present invention. FIG. 15 is a sectional diagram of the magnetic buckling assembly 100c according to the fourth embodiment of the present invention. FIG. 16 to FIG. 18 are schematic diagrams of the magnetic buckling assembly 100c in different states according to the fourth embodiment of the present invention. FIG. 19 is a partial diagram of the magnetic buckling assembly 100c according to the fourth embodiment of the present invention. FIG. 20 is an exploded diagram of the magnetic buckling assembly 100c according to the fourth embodiment of the present invention. FIG. 21 is a partial diagram of the female buckling component 1 according to the fourth embodiment of the present invention. FIG. 22 is a diagram of the male buckling component 2 according to the fourth embodiment of the present invention. As shown in FIG. 14 to FIG. 22, different from the aforementioned embodiments, the magnetic buckling assembly 100c of this embodiment further includes a protecting assembly 8. The protecting assembly 8 includes a protecting component 82 slidably disposed on the female buckling component 1 along a sliding direction intersecting with the connecting direction and movable relative to the female buckling component 1 between a first position and a second position. Preferably, in this embodiment, a sliding slot 65 can be formed on the first side of the outer cover 6 away from the second locking portion 2a, i.e., the upper side of the outer cover 6, and the protecting component 82 can be slidably disposed inside the sliding slot 65 and slidably switched between the first position and the second position. The protecting component 82 can restrain the operating component 3 from disengaging the first locking portion 1a from the second locking portion 2a when the protecting component 82 is located at the first position, and the operating component 3 is allowed to disengage the first locking portion 1a from the second locking portion 2a when the protecting component 82 is located at the second position. However, it is not limited to this embodiment. For example, in another embodiment, the protecting component also can be rotatably disposed on the male buckling component and move between the first position and the second position by rotation when the operating component is disposed on the male buckling component.

In this embodiment, the protecting component 82 includes a first end and a second end. The first end of the protecting component 82 is a resilient structure, such as a resilient arm or a resilient leg, and connected to the female buckling component 1, so that the deformed first end of the protecting component 82 can bias the second end of the protecting component 82 to recover. The second end of the protecting component 82 is configured to cover the operating component 3 for preventing the operating component 3 from being operated when the protecting component 82 is located at the first position. The second end of the protecting component 82 is configured to expose the operating component 3 for allowing the operating component 3 to be operated when the protecting component 82 is located at the second position. However, it is not limited to this embodiment. Any structure which can allow or prevent operation of the operation component 3 is included within the scope of the present invention. For example, in another embodiment, the protecting component also can be configured to engage with the operating component for preventing the operating component from being operated when the protecting component is located at the first position. The protecting component can be configured to disengage from the operating component for allowing the operating component to be operated when the protecting component is located at the second position.

Preferably, the protecting assembly 8 of the magnetic buckling assembly 100c can further include a recovering component 81 for biasing the protecting component 82 to slide to the first position. The recovering component 81 is arranged along an arrangement direction intersecting with the connecting direction. The recovering component 81 can be an elastic spring abutting between the protecting component 82 and the female buckling component 1. Specifically, the protecting component 82 includes a covering portion 821 and a guiding portion 822 connected to the covering portion 821. The covering portion 821 selectively covers or exposes the operating component 3. The guiding portion 822 is movably disposed on the female buckling component 1, and the covering portion 821 and the guiding portion 822 are misaligned with each other along the connecting direction to form a step-shaped structure. The covering portion 821 can be guided by the guiding portion 822 to move to the first position to cover the operating component 3. Preferably, in this embodiment, each of the guiding portion 822 and the covering portion 821 can be a hollow structure with an opening toward the male buckling component 2 to facilitate the covering portion 821 to cover the operating component 3 and improve aesthetic appearance of the magnetic buckling assembly 100c. However, it is not limited to this embodiment. For example, in another embodiment, when the protecting component and the operating component can be disposed on the male buckling component, the recovering component can be disposed between the male buckling component and the guiding portion of the protecting component.

Other structure and operational principle of the magnetic buckling assembly 100c of this embodiment are similar to the ones described in the aforementioned embodiments. Detailed description is omitted herein for simplicity.

Figure 23:
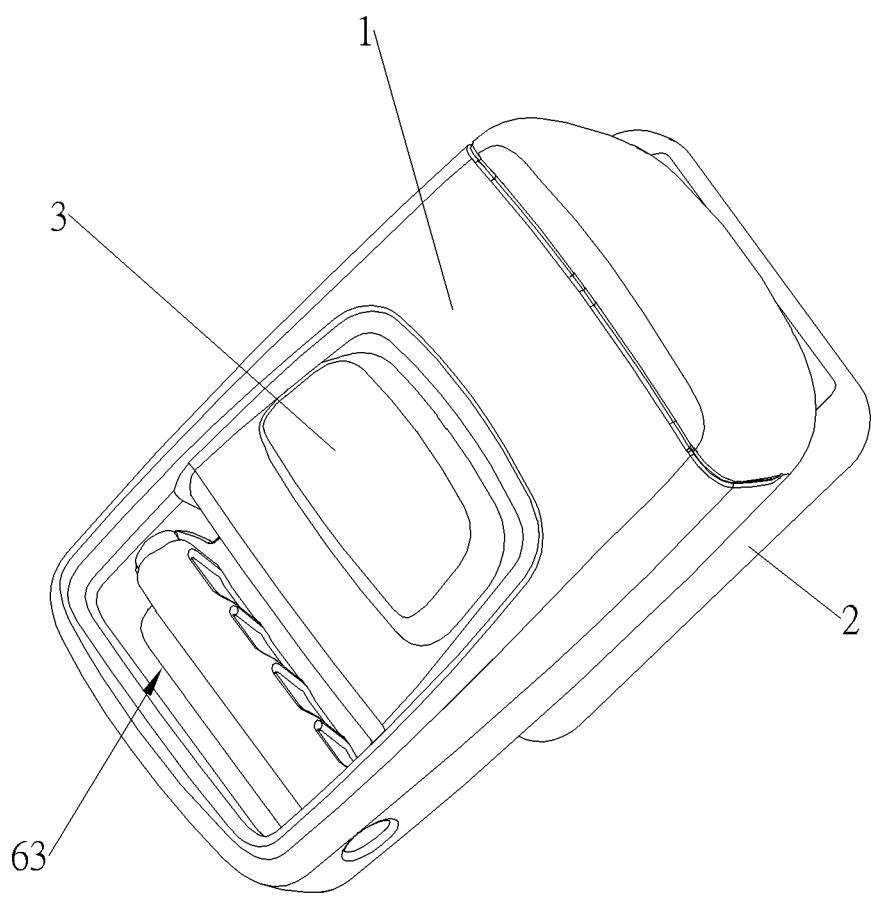
FIG. 23 and FIG. 24 are schematic diagrams of a magnetic buckling assembly at different views according to a fifth embodiment of the present invention.
Figure 24:
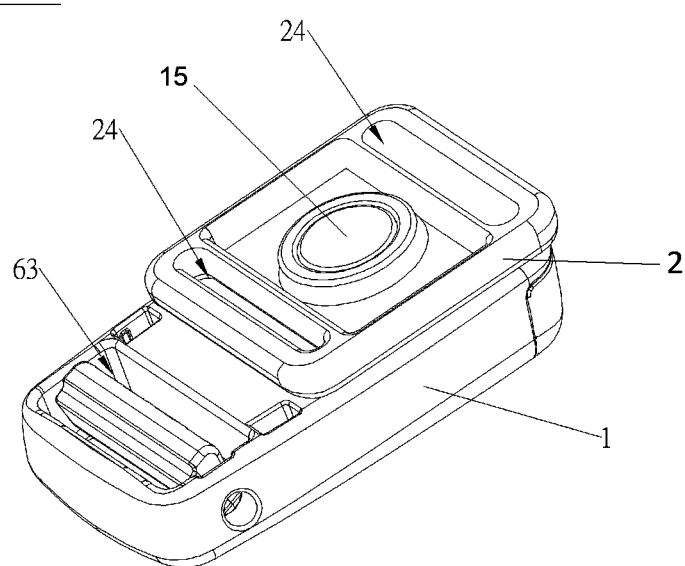
Figure 25:
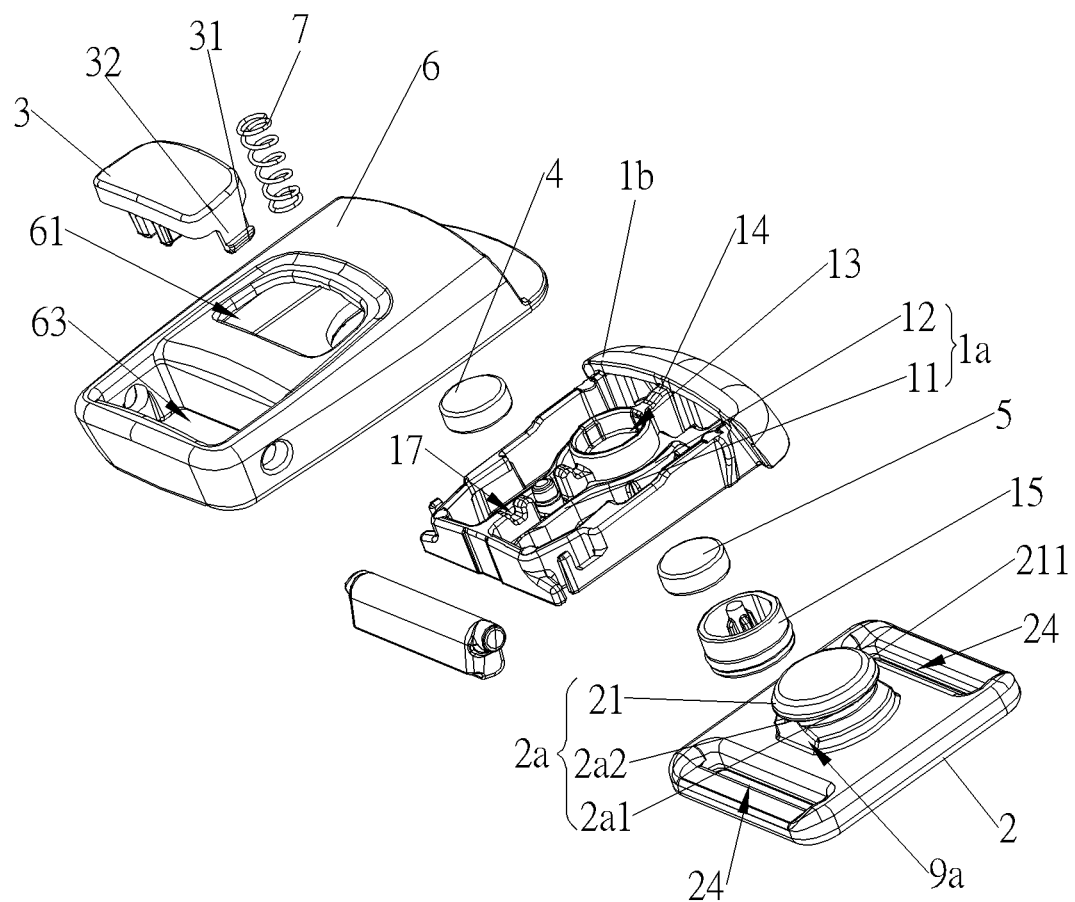
FIG. 25 and FIG. 26 are exploded diagrams of the magnetic buckling assembly at different views according to the fifth embodiment of the present invention.
Figure 26:
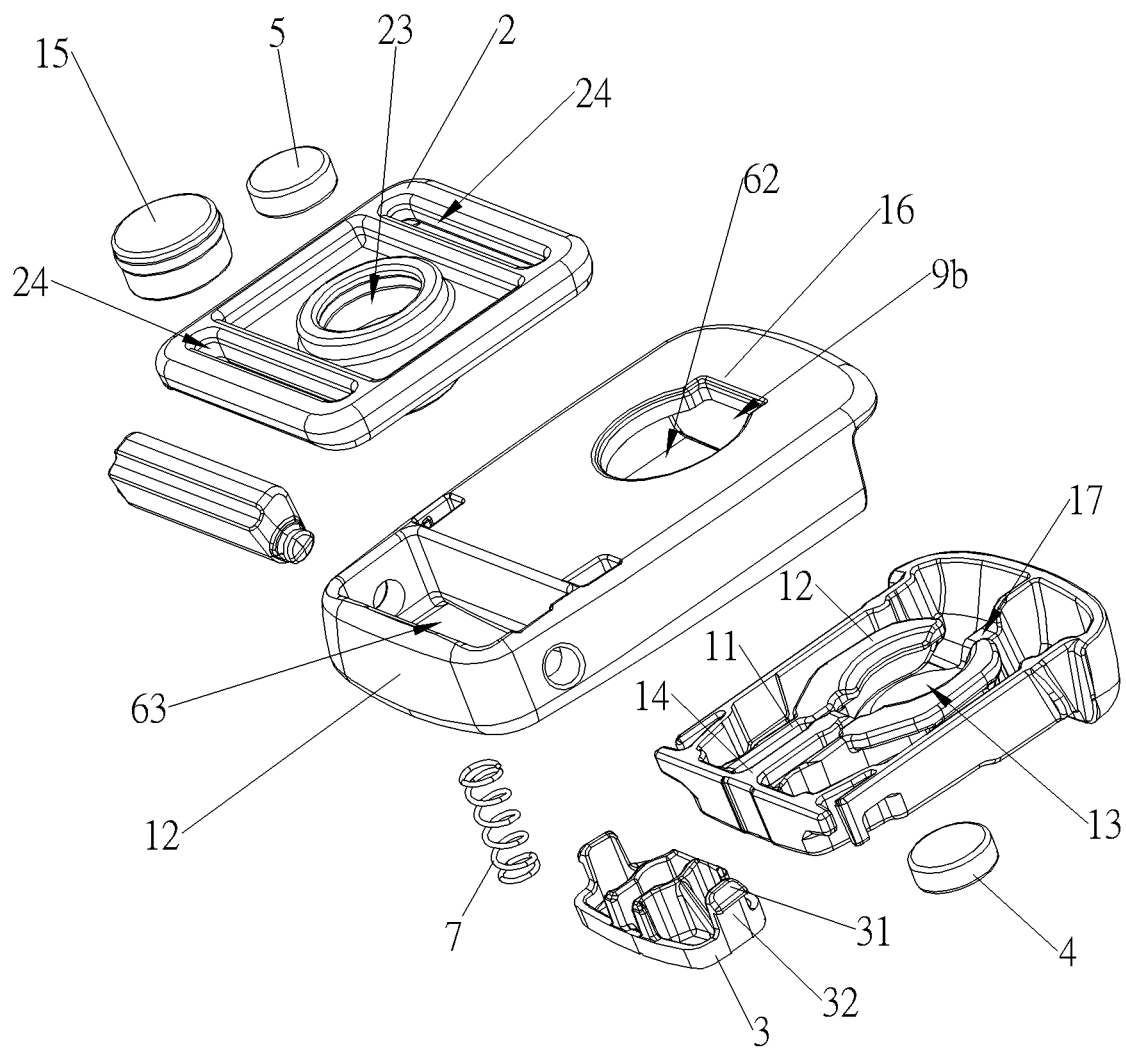
Figure 27:
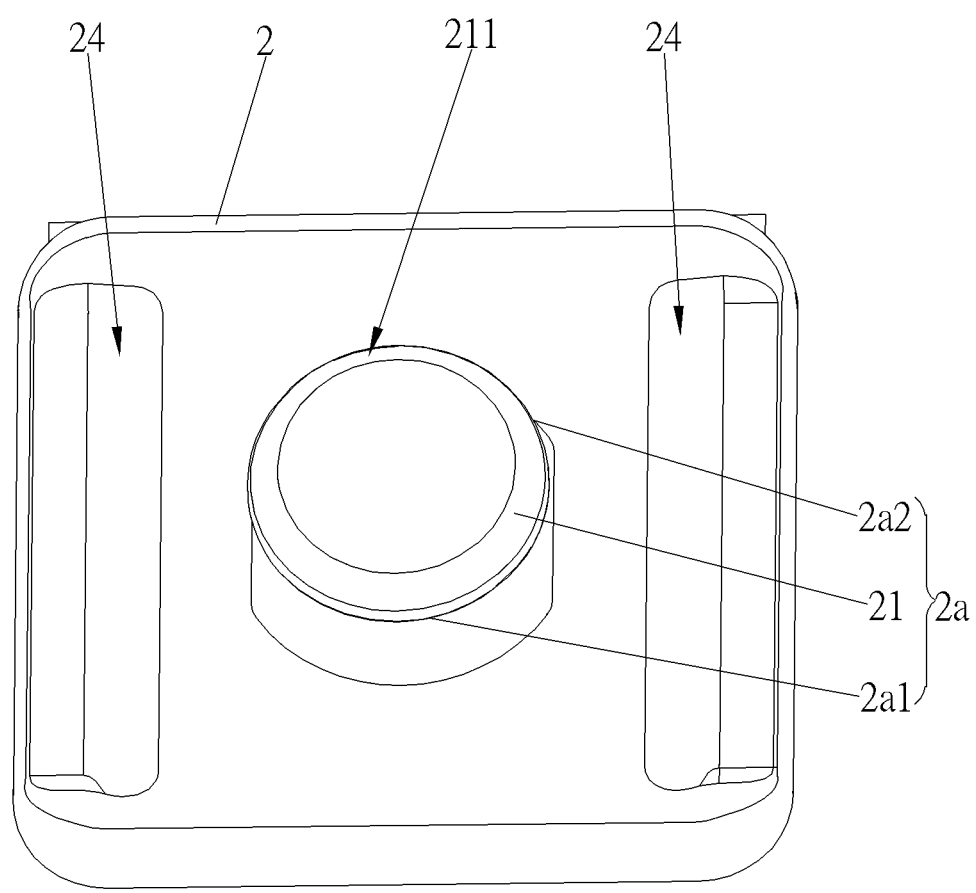
FIG. 27 is a diagram of a male buckling component according to the fifth embodiment of the present invention.
Figure 28:
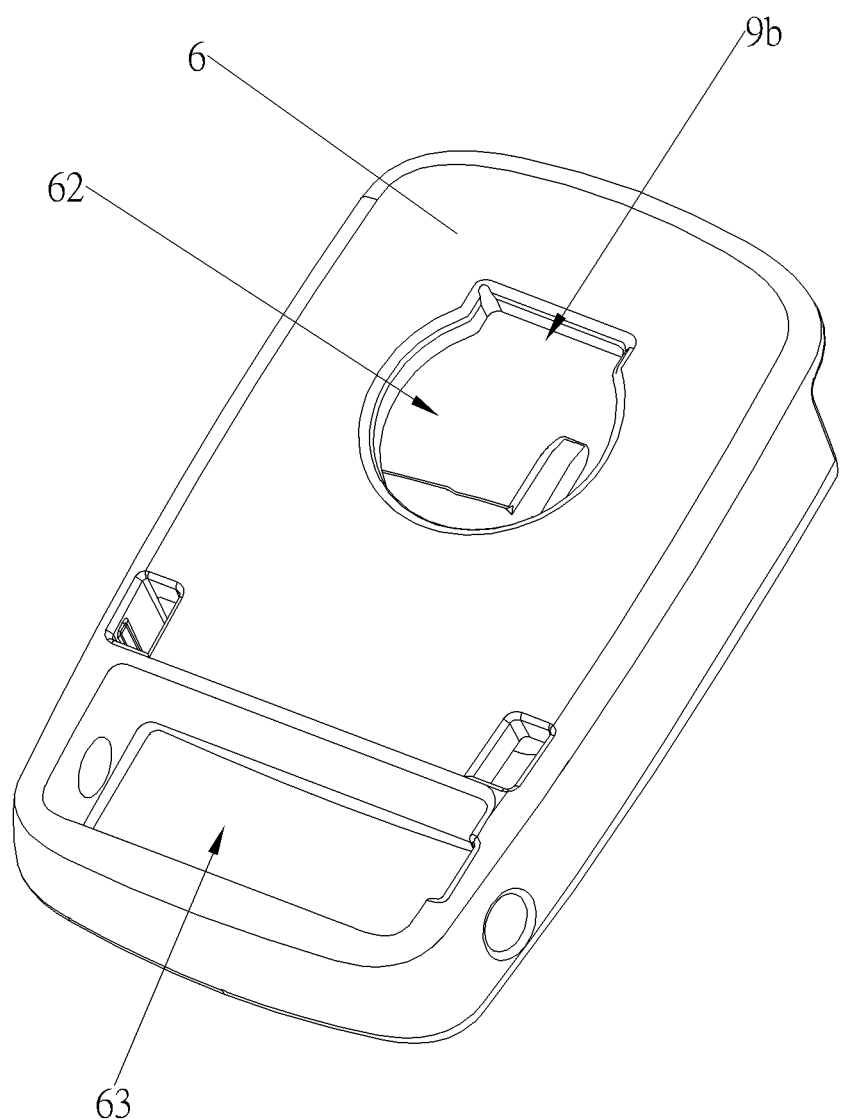
FIG. 28 is a diagram of an outer cover according to the fifth embodiment of the present invention.
Figure 29:
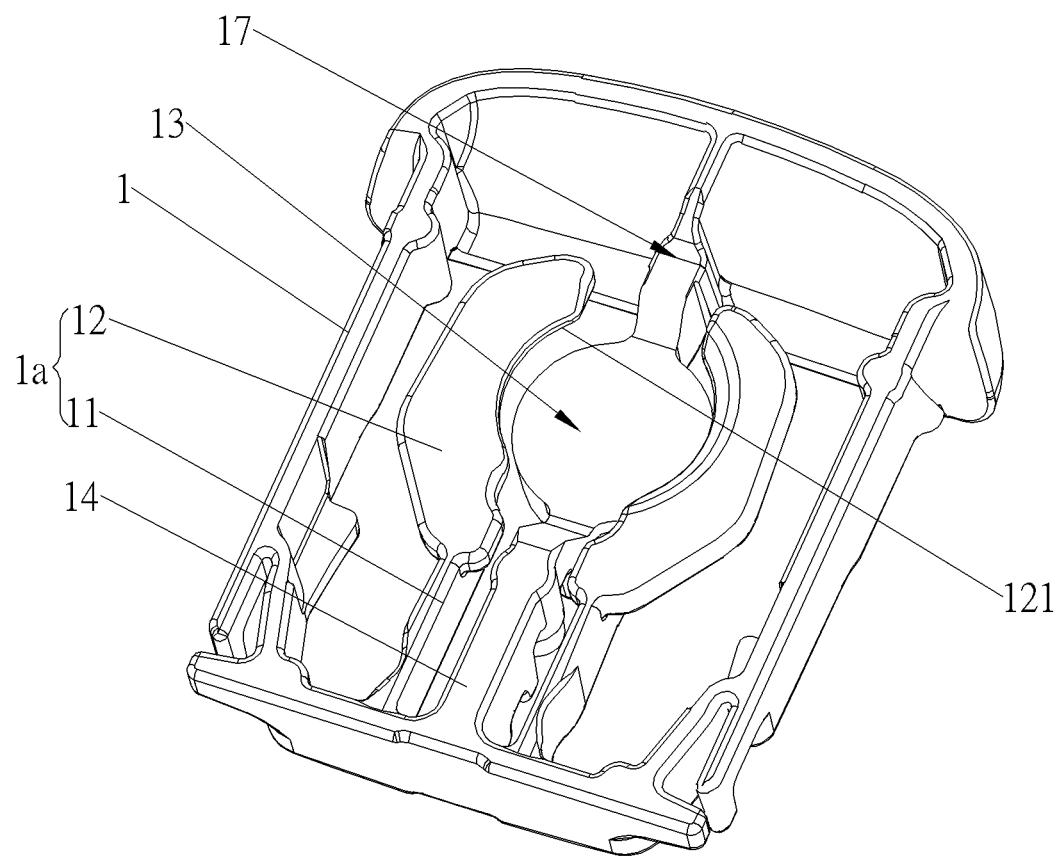
FIG. 29 is a partial diagram of a female buckling component according to the fifth embodiment of the present invention.
Figure 30:
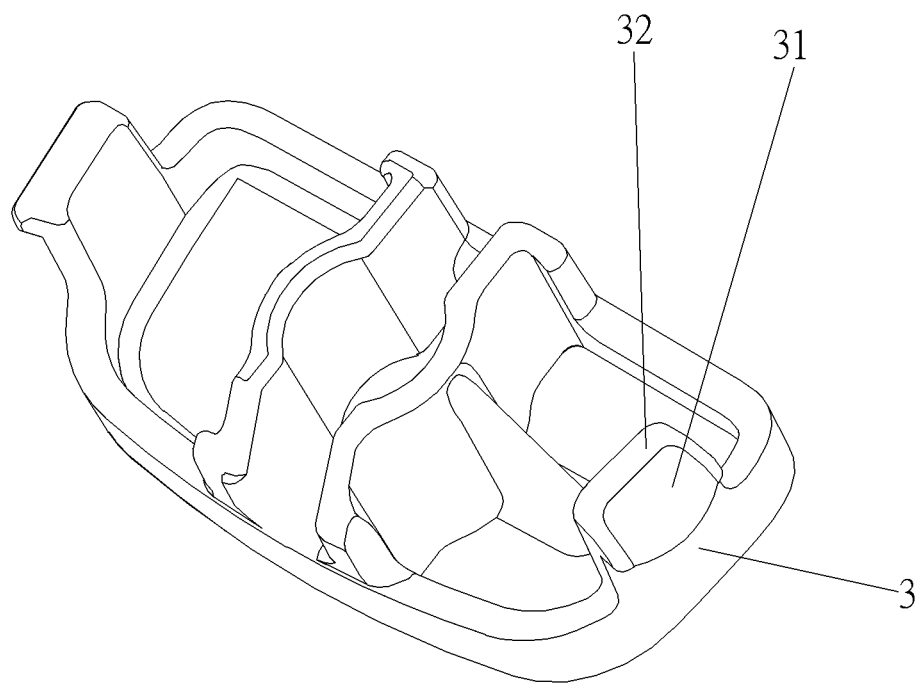
FIG. 30 is a diagram of an operating component according to the fifth embodiment of the present invention.
Figure 31:
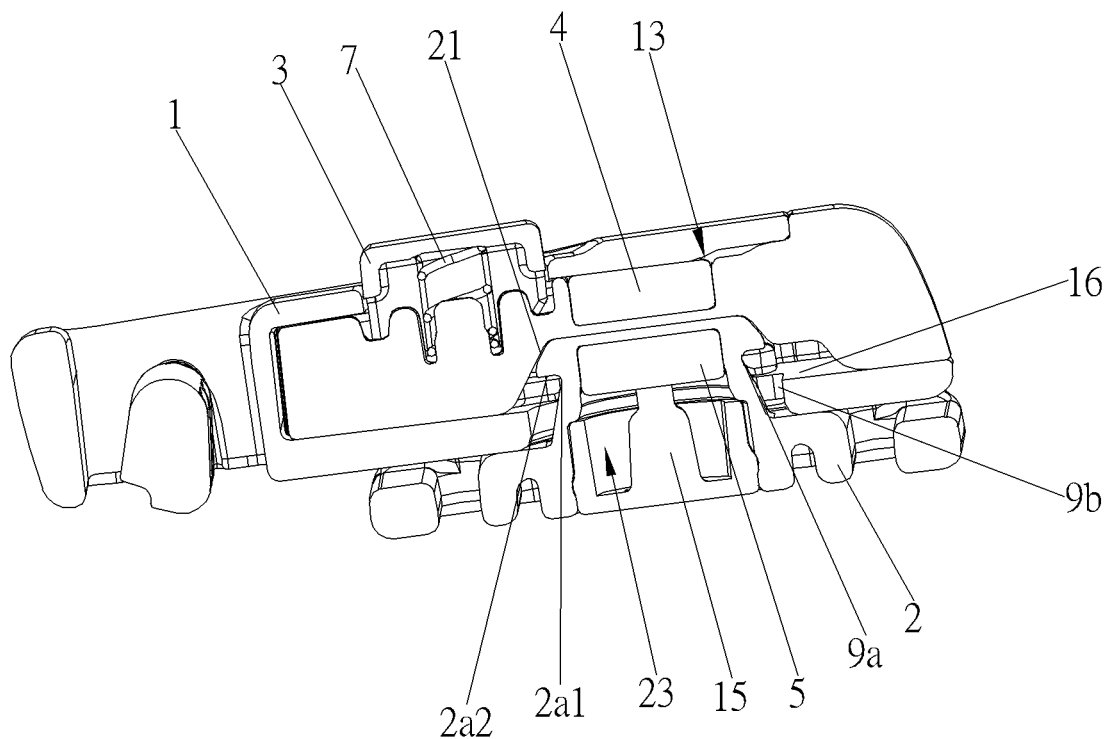
FIG. 31 and FIG. 32 are internal structural diagrams of the magnetic buckling assembly at different views according to the fifth embodiment of the present invention.
Figure 32:
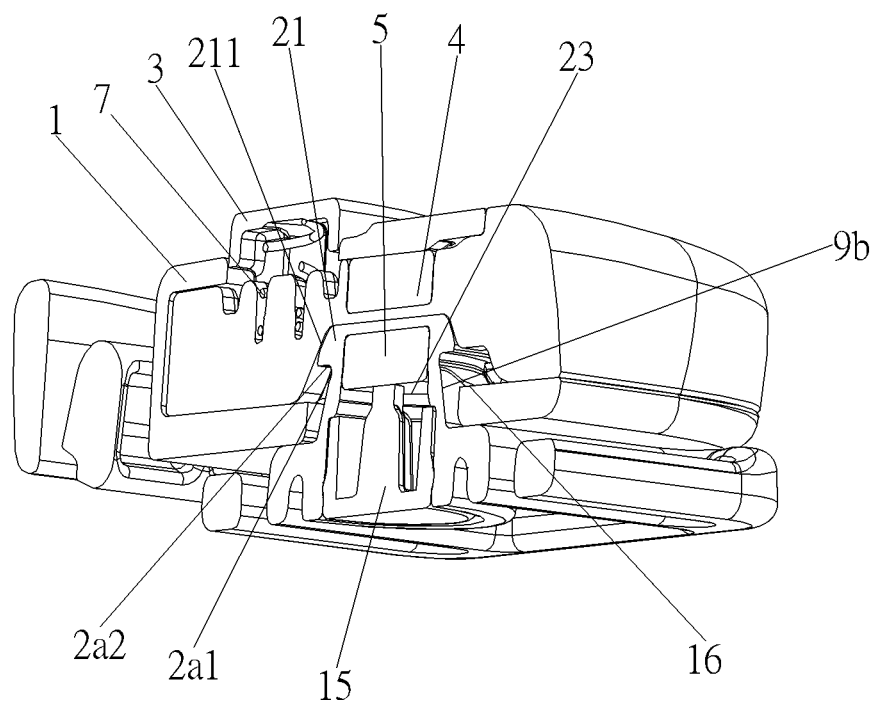

Please refer to FIG. 23 to FIG. 32. FIG. 23 and FIG. 24 are schematic diagrams of a magnetic buckling assembly 100d at different views according to a fifth embodiment of the present invention. FIG. 25 and FIG. 26 are exploded diagrams of the magnetic buckling assembly 100d at different views according to the fifth embodiment of the present invention. FIG. 27 is a diagram of the male buckling component 2 according to the fifth embodiment of the present invention. FIG. 28 is a diagram of the outer cover 6 according to the fifth embodiment of the present invention. FIG. 29 is a partial diagram of the female buckling component 1 according to the fifth embodiment of the present invention. FIG. 30 is a diagram of the operating component 3 according to the fifth embodiment of the present invention. FIG. 31 and FIG. 32 are internal structural diagrams of the magnetic buckling assembly 100d at different views according to the fifth embodiment of the present invention. As shown in FIG. 23 to FIG. 32, different from the aforementioned embodiments, the female buckling component 2 of this embodiment further includes a supporting cover 15 disposed inside the second installation chamber 23 for covering and supporting the second magnetic component 5. Furthermore, two first clearance structures 9a are formed on the second locking portion 2a. The female buckling component 1 includes an abutting portion 16 for abutting against the second locking portion 2a for preventing the separation of the male buckling component 2 and the female buckling component 1 when the second locking portion 2a is located at the offsetting position. Preferably, in this embodiment, each first clearance structure 9a can be a clearance slot, and the two clearance slots can be opposite to each other and spaced from each other along a direction parallel to an offsetting direction intersecting with the connecting direction. The second locking portion 2a can include two first partitions 2a1 and two second partitions 2a2. The two first partitions 2a1 can be opposite to each other and spaced from each other along a direction perpendicular to the offsetting direction. The two second partitions 2a2 can be opposite to each other and spaced from each other along the direction parallel to the offsetting direction. That is, each second partition 2a2 is adjacent to and located between the two second partitions 2a1. The first partitions 2a1 can engage with the first locking portion 1a. The abutting portion 16 can abut against one of the two second partitions 2a2, which can save time of alignment of the male buckling component 2 and the female buckling component 1 and bring convenience in use. However, the numbers of the clearance slot, the first partition 2a1 and the second partition 2a2 are not limited to this embodiment.

Furthermore, a second clearance structure 9b is formed on the outer cover 6 of the female buckling component 1. Preferably, in this embodiment, the second clearance structure 9b can be a clearance hole communicated with the connecting hole 62, and the abutting portion 16 is formed on the outer cover 6 of the female buckling component 1. After the second locking portion 2a passes through the connecting hole 62 to engage with the first locking portion 1a, the second locking portion 2a can slide toward the clearance hole to the offsetting position. Preferably, the abutting portion 16 is located on an inner surface of the outer cover 6 adjacent to an inner wall of the clearance hole, which allows the abutting portion 16 to abut against the corresponding second partition 2a2 quickly during an offsetting process of the second locking portion 2a.

Furthermore, contacting surfaces of the lateral wall of the two clearance slots and a contacting surface of the inner wall of the clearance hole can be flat surfaces, so that the contacting surface of the inner wall of the clearance hole can be attached to and abut against the contacting surface of the lateral wall of the corresponding clearance slot when the second locking portion 2a is located at the offsetting position, which effectively prevents accidental disengagement of the male buckling component 2 and the female buckling component 1. However, it is not limited to this embodiment. For example, the contacting surface of the lateral wall of the clearance slot and the contacting surface of the inner wall of the clearance hole can be curved surfaces. Furthermore, the connecting hole can preferably be an arc-shaped hole, and the clearance hole can preferably be a rectangular hole and communicated with the arc-shape hole.

However, it is not limited to this embodiment. Any structure or any configuration, which allows the second locking portion 2a to slide along the offsetting direction intersecting with the connecting direction to the offsetting position for preventing disengagement of the male buckling component 2 and the female buckling component 1 after the first locking portion 1a engages with the second locking portion 2a, is included within the scope of the present invention. For example, in another embodiment, at least one clearance structure can be formed on at least one of the second locking portion and the female buckling component for allowing the second locking portion to slide along the offsetting direction intersecting with the connecting direction to the offsetting position after the first locking portion engages with the second locking portion. Alternatively, at least one clearance structure can be formed on the male buckling component if the second locking portion is disposed on the female buckling component.

Besides, preferably, in this embodiment, a notch 17 can be formed on the buckling body 1b and corresponding to the clearance hole. The notch 17 is parallel to the connecting direction. The second partition 2a2 of the second locking portion 2a can slide into the notch 17 during an offsetting process of the second locking portion 2a. In other words, the notch 17 allows the second partition 2a2 to slide without obstruction during the offsetting process of the second locking portion.

Other structure and operational principle of the magnetic buckling assembly 100d of this embodiment are similar to the ones described in the aforementioned embodiments. Detailed description is omitted herein for simplicity.

In contrast to the prior art, the present invention utilizes engagement of the first locking portion and the second locking portion for connecting the male buckling component to the female buckling component. Furthermore, the present invention further utilizes magnetic cooperation of the first magnetic component and the second magnetic component for securing connection between the male buckling component and the female buckling component. Therefore, the connection between the male buckling component and the female buckling component is more reliable. If the first magnetic component is configured to magnetically attract the second magnetic component, the male buckling component can still be connected to the female buckling component in a condition that the first locking portion and the second locking portion are disengaged from each other due to an operational mistake of the operating component, which provides better safety in use and prevents the male buckling component or the female buckling component from falling and missing due to disengagement of the male buckling component or the female buckling component. On the other hand, if the first magnetic component is configured to magnetically repulse the second magnetic component, the male buckling component can be connected to the female buckling component because the first locking portion and the second locking portion can be driven to abut against each other by magnetic repulsion of the first magnetic component and the second magnetic component, which makes the connection of the male buckling component and the female buckling component more reliable. Furthermore, the male buckling component can be driven to be separated from the female buckling component by the magnetic repulsion of the first magnetic component and the second magnetic component in a condition that the first locking portion and the second locking portion are disengaged from each other by the operating component, which provides convenience in use. Besides, the magnetic buckling assembly of the present invention also has an advantage of compact structure.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A male buckling component and a female buckling component for a magnetic buckling assembly, the male buckling component comprising:
    a male locking portion having a column structure, the male locking portion comprising:
    an abutting structure at a first end of the column structure; and
    a male engaging structure adjacent to the abutting structure and formed around a circumference of the column structure;
    an installation chamber formed inside at least the abutting structure and the male engaging structure of the column structure of the male locking portion, the installation chamber being accessible via a second end of the column structure opposite the first end; and
    a male magnetic component installed into the installation chamber via the second end of the column structure so that the male magnetic component is inside at least the abutting structure of the male locking portion of the male buckling component; and
    the female buckling component comprising a female locking portion to engage with the male locking portion of the male buckling component along a connecting direction;
    the abutting structure of the male locking portion is configured to push and deform the female locking portion when the male locking portion engages the female locking portion along the connecting direction; and
    wherein the female locking portion is configured to disengage with the male locking portion of the male buckling component along the connecting direction.

2. The male buckling component and the female buckling component of claim 1, wherein the abutting structure of the male locking portion includes an inclined structure.

3. The male buckling component and the female buckling component of claim 1, wherein the male engaging structure of the male locking portion includes a hook slot.

4. The male buckling component and the female buckling component of claim 1, further comprising a supporting cover disposed inside the installation chamber to cover the male magnetic component.

5. The male buckling component and the female buckling component of claim 1, further comprising a base, wherein the column structure of the male locking portion is coupled to and protrudes from the base.

6. The male buckling component and the female buckling component of claim 5, further comprising at least one strap coupled to the base.

7. The male buckling component and the female buckling component of claim 6, in combination with a cloth surface to which the male buckling component is fixed via the at least one strap coupled to the base.

8. The male buckling component and the female buckling component of claim 1, further comprising at least one assembling portion for installing at least one strap.

9. The male buckling component and the female buckling component of claim 8, wherein the at least one assembling portion includes at least one through hole for the at least one strap.

10. The male buckling component and the female buckling component of claim 8, wherein:
    the at least one assembling portion includes two assembling portions opposite to each other; and
    each assembling portion of the two assembling portions includes a through hole.

11. The male buckling component and the female buckling component of claim 1, wherein the abutting structure of the male locking portion includes an inclined structure inclined relative to the connecting direction.

12. The male buckling component and the female buckling component of claim 11, wherein the inclined structure of the abutting structure is formed around the circumference of the column structure of the male locking portion.

13. A baby carrier, comprising two or more straps configured to be connected and disconnected by the male buckling component and the female buckling component of claim 12.

14. The male buckling component and the female buckling component of claim 11, wherein:
    the female locking portion is a resilient structure; and
    the abutting structure of the male locking portion is configured to push and deform the resilient structure of the female locking portion when the male locking portion engages the female locking portion along the connecting direction so that the female locking portion slides to engage with the engaging structure of the male locking portion.

15. The male buckling component and the female buckling component of claim 14, wherein:
    the resilient structure of the female locking portion includes at least one resilient arm coupled to a corresponding at least one engaging head, the at least one resilient arm biasing the corresponding at least one engaging head to engage with the engaging structure of the male locking portion;
    the corresponding at least one engaging head includes an engaging head inclined structure; and
    the inclined structure of the abutting structure of the male locking portion cooperates with the engaging head inclined structure so that the abutting structure slides across the corresponding at least one engaging head to engage the engaging structure with the corresponding at least one engaging head.

16. A baby carrier, comprising two or more straps configured to be connected and disconnected by the male buckling component and the female buckling component of claim 14.

17. The male buckling component and the female buckling component of claim 15, wherein:
    the corresponding at least one engaging head includes a hook; and
    the engaging structure of the male locking portion includes a hook slot to engage with the hook of the corresponding at least one engaging head.

18. A baby carrier, comprising two or more straps configured to be connected and disconnected by the male buckling component and the female buckling component of claim 15.

19. The male buckling component and the female buckling component of claim 17, in combination with the female buckling component to form the magnetic buckling assembly.

20. A baby carrier, comprising two or more straps configured to be connected and disconnected by the male buckling component and the female buckling component of claim 17.

21. The combination of claim 19, wherein the at least one resilient arm and the corresponding at least one engaging head of the female locking portion includes one of:
one resilient arm and one corresponding engaging head;
two resilient arms and two corresponding engaging heads;
three resilient arms and three corresponding engaging heads;
four resilient arms and four corresponding engaging heads; or
five resilient arms and five corresponding engaging heads.

22. The combination of claim 19, wherein the male buckling component is rotatable relative to the female buckling component around the male locking portion of the male buckling component.

23. A baby carrier, comprising two or more straps configured to be connected and disconnected by the male buckling component and the female buckling component of claim 11.

24. The male buckling component and the female buckling component of claim 1, in combination with the female buckling component to form the magnetic buckling assembly, wherein the male buckling component is rotatable relative to the female buckling component around the male locking portion of the male buckling component.

25. A baby carrier, comprising two or more straps configured to be connected and disconnected by the male buckling component and the female buckling component of claim 1.

26. A baby carrier, comprising two or more straps configured to be connected and disconnected by the male buckling component and the female buckling component of claim 19.

27. A male buckling component and a female buckling component for a magnetic buckling assembly, the male buckling component comprising:
a male locking portion having a column structure, the male locking portion comprising:
an abutting structure at an end of the column structure, wherein the abutting structure of the male locking portion includes an inclined structure formed around a circumference of the column structure of the male locking portion; and
a male engaging structure adjacent to the abutting structure and formed around the circumference of the column structure;
an installation chamber formed inside the male locking portion; and
a male magnetic component installed into the installation chamber so that the male magnetic component is hidden inside the male locking portion of the male buckling component;
the female buckling component comprising a female locking portion to engage with the male locking portion of the male buckling component along a connecting direction;
the abutting structure of the male locking portion is configured to push and deform the female locking portion when the male locking portion engages the female locking portion along the connecting direction; and
wherein the female locking portion is configured to disengage with the male locking portion of the male buckling component along the connecting direction.

28. The male buckling component and the female buckling component of claim 27, wherein:
the magnetic buckling assembly comprises a female buckling component including a female locking portion to engage with the male locking portion of the male buckling component along a connecting direction;
the female locking portion is a resilient structure;
the resilient structure of the female locking portion includes at least one resilient arm coupled to a corresponding at least one engaging head, the at least one resilient arm biasing the corresponding at least one engaging head to engage with the engaging structure of the male locking portion;
the corresponding at least one engaging head includes an engaging head inclined structure; and
the inclined structure of the abutting structure of the male locking portion cooperates with the engaging head inclined structure so that the abutting structure slides across the corresponding at least one engaging head to engage the engaging structure with the corresponding at least one engaging head.

29. A baby carrier, comprising two or more straps configured to be connected and disconnected by the male buckling component and the female buckling component of claim 27.

30. A baby carrier, comprising two or more straps configured to be connected and disconnected by the male buckling component and the female buckling component of claim 28.

* * * * *